(12) United States Patent
Shiraishi et al.

(10) Patent No.: US 8,331,705 B2
(45) Date of Patent: Dec. 11, 2012

(54) IMAGE ENCODING APPARATUS AND METHOD OF CONTROLLING THE SAME

(75) Inventors: Yuki Shiraishi, Tokyo (JP); Hiroshi Kajiwara, Inagi (JP); Naoki Ito, Tokyo (JP); Hirokazu Tamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 539 days.

(21) Appl. No.: 12/620,194

(22) Filed: Nov. 17, 2009

(65) Prior Publication Data

US 2010/0124380 A1    May 20, 2010

(30) Foreign Application Priority Data

Jan. 30, 2009  (JP) ................. 2009-020743

(51) Int. Cl.
*G06K 9/36* (2006.01)
(52) U.S. Cl. ...................... 382/238; 382/243
(58) Field of Classification Search .......... 382/238, 382/243
See application file for complete search history.

(56) References Cited

U.S. PATENT DOCUMENTS

| | | | | |
|---|---|---|---|---|
| 4,468,808 A * | 8/1984 | Mori et al. | ...... | 382/196 |
| 4,525,748 A * | 6/1985 | Carbone | ...... | 358/2.1 |
| 4,709,394 A * | 11/1987 | Bessler et al. | ...... | 382/240 |
| 5,159,468 A * | 10/1992 | Yoshida et al. | ...... | 358/451 |
| 5,282,255 A * | 1/1994 | Bovik et al. | ...... | 382/239 |
| 5,583,953 A * | 12/1996 | Harrington | ...... | 382/239 |
| 5,740,285 A * | 4/1998 | Bloomberg et al. | ...... | 382/299 |
| 5,862,268 A * | 1/1999 | Boehlke | ...... | 382/299 |
| 5,867,593 A * | 2/1999 | Fukuda et al. | ...... | 382/176 |
| 6,304,339 B1 * | 10/2001 | Miller et al. | ...... | 358/1.9 |
| 6,373,890 B1 * | 4/2002 | Freeman | ...... | 375/240 |
| 6,442,297 B1 * | 8/2002 | Kondo et al. | ...... | 382/240 |
| 6,915,020 B2 * | 7/2005 | Damera-Venkata et al. | . | 382/253 |
| 7,085,379 B1 * | 8/2006 | Kagechi et al. | ...... | 382/166 |

(Continued)

FOREIGN PATENT DOCUMENTS

JP    08-167030    6/1996

(Continued)

OTHER PUBLICATIONS

"Lossless compression of medical images by prediction and classification," Heesub Lee et al, Optical Engineering Jan. 1, 1994 / vol. 33 No. 1, pp. 160-166.*
Paul J. Ausbeck Jr., Context Models for Palette Images, Data Compression Conference, IEEE Comput. Soc., Mar. 30, 1998 pp. 309-318 XP0102765700.

(Continued)

*Primary Examiner* — Wenpeng Chen
(74) *Attorney, Agent, or Firm* — Cowan, Liebowitz & Latman, P.C.

(57) ABSTRACT

This invention generates efficient encoded data to restore original image data from reduced image data. An input unit inputs block data of 2×2 pixels from original image data. A converter generates reduced image data having a size smaller than the original image data by sampling one pixel data at a preset position in the input block data. A generator generates encoded data to restore three non-sampling target pixel data in each block data so as to restore the original image data from the reduced image data generated by the resolution converter. To do this, the generator determines whether all non-sampling target pixels in a block of interest are restorable from a sampling target pixel in the block of interest or from sampling target pixels in three blocks adjacent to the block of interest, and generates and outputs three kinds of additional information based on the determination result.

9 Claims, 19 Drawing Sheets

U.S. PATENT DOCUMENTS

| | | | |
|---|---|---|---|
| 7,139,099 B2 * | 11/2006 | Hashizume et al. | 358/2.1 |
| 7,477,802 B2 * | 1/2009 | Milanfar et al. | 382/299 |
| 7,545,997 B2 * | 6/2009 | Lieberman et al. | 382/298 |
| 8,229,234 B2 * | 7/2012 | Takada | 382/238 |
| 2001/0017705 A1 * | 8/2001 | Hashizume et al. | 358/1.9 |
| 2001/0019630 A1 * | 9/2001 | Johnson | 382/232 |
| 2006/0066909 A1 * | 3/2006 | Yamamoto | 358/3.13 |
| 2012/0114228 A1 * | 5/2012 | Tamura | 382/162 |

FOREIGN PATENT DOCUMENTS

| | | |
|---|---|---|
| JP | 10-173913 | 6/1998 |
| JP | 2001-313834 | 11/2001 |

OTHER PUBLICATIONS

Nasir D. Memon et al, Lossless Image Compression: A Comparative Study, Proceedings of SPIE, Jan. 1, 1995 vol. 2418 pp. 8-20 XP000911800.

Whoi-Yul Kim et al, Hierarchy Embedded Differential Image for Progressive Transmission Using Lossless Compression, IEEE Transactions on Circuits and Systems for Video Technology, Feb. 1, 1995 vol. 5, No. 1, pp. 1-13 XP000488402.

European Search Report issued on Jan. 16, 2012, which is enclosed, that issued in the corresponding European Patent Application No. 09174845.9.

* cited by examiner

FIG. 5
|  | FLAG | PIXEL VALUE INFORMATION |
|---|---|---|
| FIRST ADDITIONAL INFORMATION | 1 | — |
| SECOND ADDITIONAL INFORMATION | 01 | — |
| THIRD ADDITIONAL INFORMATION | 00 | 24bit |
FIG. 6A
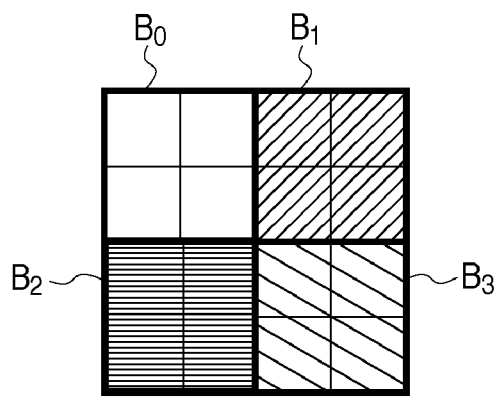
FIG. 6B
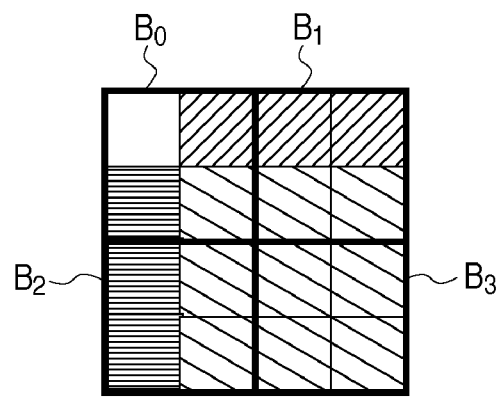

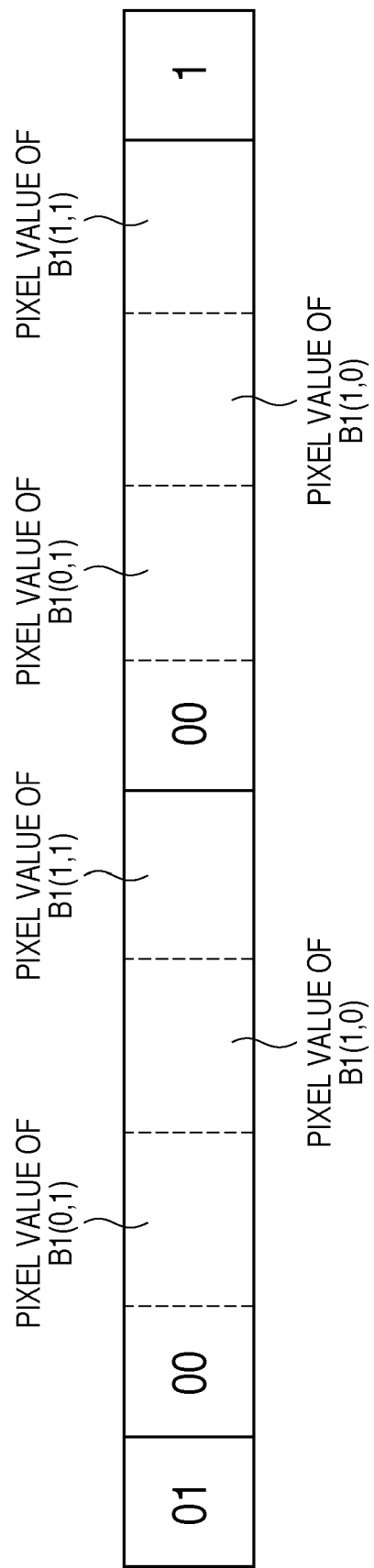

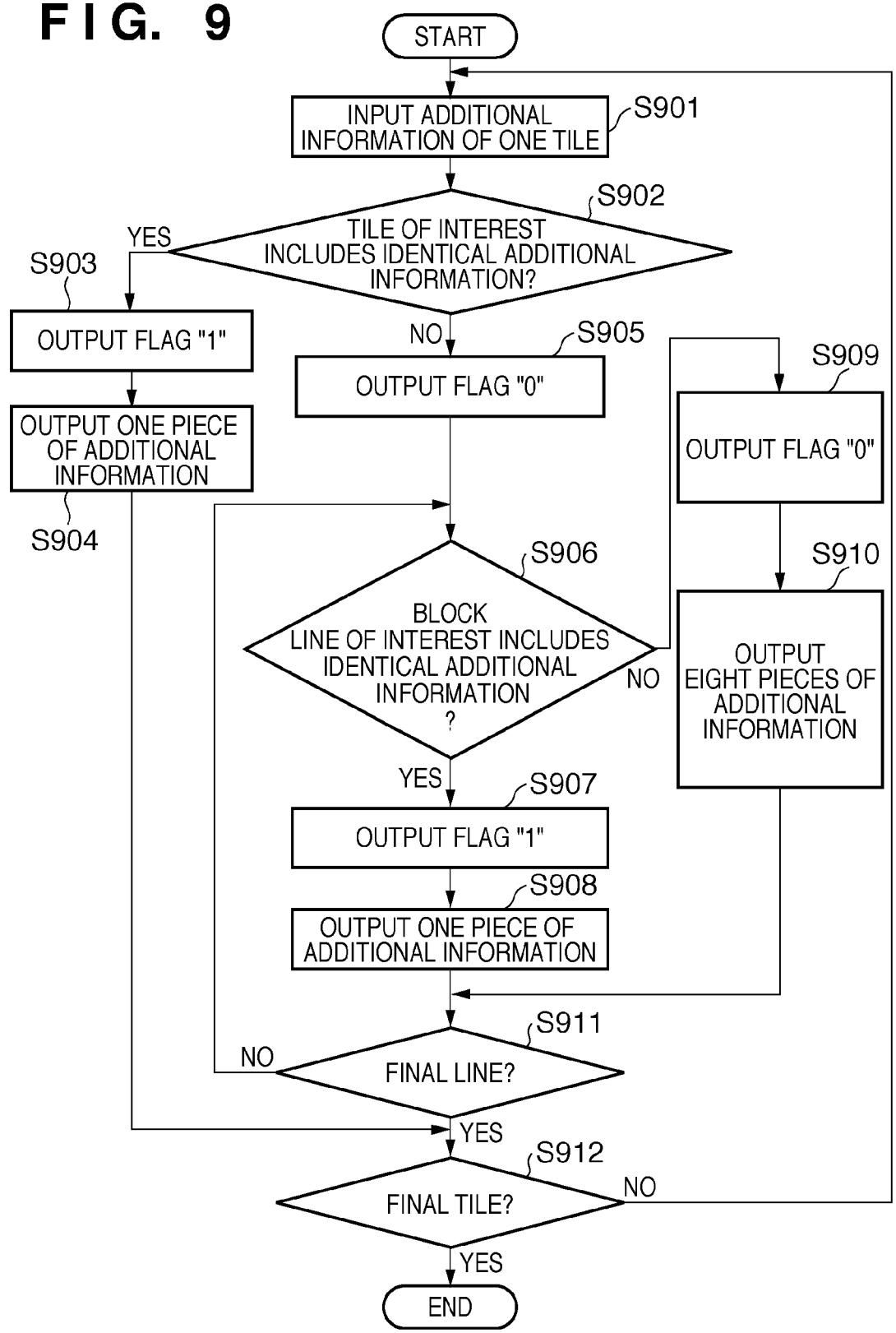

FIG. 10A
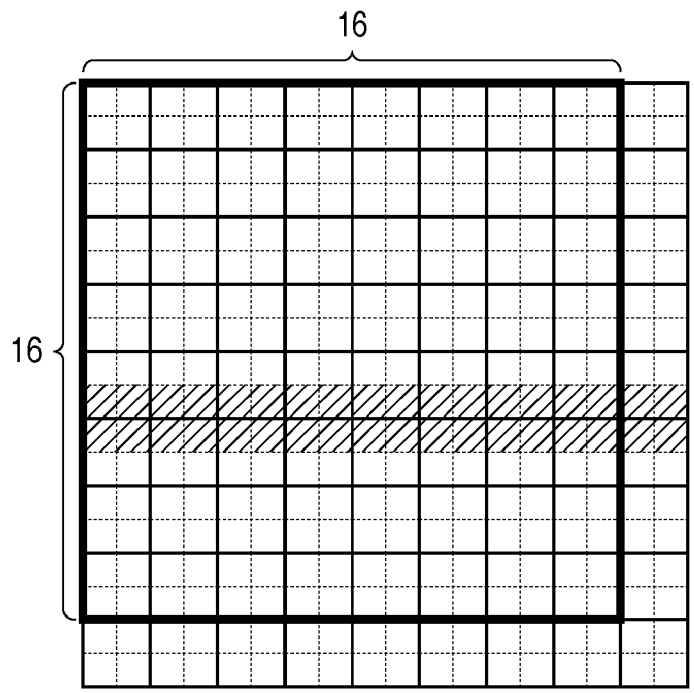
FIG. 10C
FLAG REPRESENTING
NON-INTEGRATION TO TILE
FIG. 10B
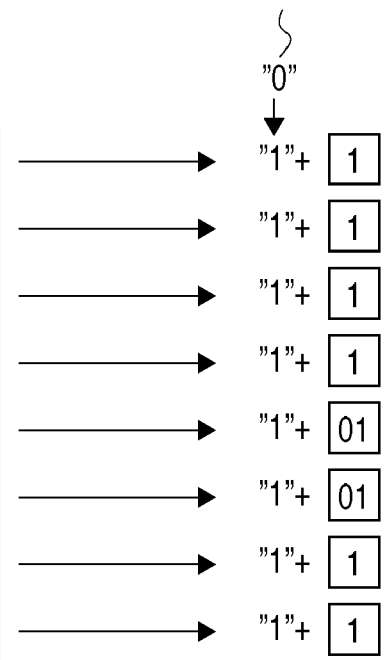

FIG. 18

IMAGE ENCODING APPARATUS AND METHOD OF CONTROLLING THE SAME

BACKGROUND OF THE INVENTION

1. Field of the Invention

The present invention relates to an image encoding apparatus and a method of controlling the same.

2. Description of the Related Art

Image data with a high resolution and a wide color gamut has an enormous data size and also requires high memory cost and long time for image processing or data transfer. This makes data handling difficult. To solve this problem, a method has conventionally been proposed which holds, for a plurality of pixels, one piece of color information and information representing the arrangement of the color, thereby converting an original resolution image into data in a smaller size (e.g., Japanese Patent Laid-Open No. 2001-313834).

Another method has also been proposed which separates image data into text image portions and photo image portions and generates reduced images thereof. These pieces of information are held. To restore the original resolution image, restoration target pixels are predicted and restored based on the pixels of a reduced image of interest and their neighboring pixels (e.g., Japanese Patent Laid-Open No. 10-173913).

In a method of generating interpolation data as well as reduced images generated by resolution conversion, the interpolation data requires at least color information and arrangement information for color arrangement to reproduce the original resolution image. To do this, at least one piece of arrangement information needs to be held for one pixel of the original resolution image. Hence, the effect of decreasing the code amount of the interpolation data is limited to 1/(data amount of one pixel).

In a method of interpolating a restoration target image based on a predetermined rule without generating interpolation data, data to be interpolated is only an estimated value. For this reason, it is impossible to losslessly reproduce the original resolution image.

SUMMARY OF THE INVENTION

The present invention has been made in consideration of the above problems. The present invention provides a technique of generating reduced image data from original image data and adding efficient encoded data to the reduced image data, thereby restoring the original image data from the reduced image data. The present invention provides a technique of facilitating lossless and lossy conversion by controlling interpolation data.

In order to solve the above problems, the present invention in its first aspect provides an image encoding apparatus for encoding image data, comprising an input unit which inputs a block of 2×2 pixels from original image data of an encoding target;

a reduced image generator which generates and outputs reduced image data having a size smaller than the original image data by sampling one pixel data at a preset position in the input block; and an encoder which generates encoded data to restore three non-sampling target pixel data in each block so as to restore the original image data from the reduced image data generated by the reduced image generator, wherein the encoder comprising:

a determination unit which, letting X be a sampling target pixel in a block of interest, and Xa, Xb, and Xc be non-sampling target pixels in the block of interest, determines condition (a): whether all the pixels Xa, Xb, and Xc are restorable from the pixel X in the block of interest, and condition (b): whether all the pixels Xa, Xb, and Xc are restorable from sampling target pixels in three blocks adjacent to the block of interest; and an additional information generator which generates first additional information as encoded data of the block of interest when the determination unit has determined that the block of interest satisfies the condition (a), generates second additional information different from the first additional information as the encoded data of the block of interest when the determination unit has determined that the block of interest satisfies not the condition (a) but the condition (b), and generates third additional information different from the first additional information and the second additional information as the encoded data of the block of interest when the determination unit has determined that the block of interest satisfies neither the condition (a) nor the condition (b).

The present invention in its second aspect provides an image encoding apparatus for encoding image data, comprising a reduced image generator which generates and outputs reduced image data having a size smaller than original image data of an encoding target by sampling one pixel data at a preset position in a block of 2×2 pixels of the original image data;

an input unit which inputs a tile including pixel data of 2M horizontal pixels×2N vertical pixels (each of M and N is an integer not less than 2) in the original image data; and a tile encoder which generates, for each tile, encoded data to restore three non-sampling target pixel data in each of M×N blocks in the input tile except for a sampling target pixel for generation of the reduced image data, wherein the tile encoder comprising:

defining a block in which all three non-sampling target pixels are restorable from a sampling target pixel as a flat block and a block in which at least one of three non-sampling target pixels is not restorable from a sampling target pixel as a non-flat block, a first determination unit which determines whether all blocks in a tile of interest are flat blocks or include at least one non-flat block, and outputs flag information representing a determination result; and a block line encoder which encodes each block line including M blocks arrayed horizontally in the tile of interest when the first determination unit has determined that at least one block in the tile of interest is the non-flat block.

The present invention in its third aspect provides a method of controlling an image encoding apparatus for encoding image data, comprising the steps of inputting a block of 2×2 pixels from original image data of an encoding target;

generating and outputting reduced image data having a size smaller than the original image data by sampling one pixel data at a preset position in the input block; and generating encoded data to restore three non-sampling target pixel data in each block so as to restore the original image data from the reduced image data generated in the step of generating and outputting the reduced image data, wherein the step of generating the encoded data comprising the steps of:

letting X be a sampling target pixel in a block of interest, and Xa, Xb, and Xc be non-sampling target pixels in the block of interest, determining condition (a): whether all the pixels Xa, Xb, and Xc are restorable from the pixel X in the block of interest, and condition (b): whether all the pixels Xa, Xb, and Xc are restorable from sampling target pixels in three blocks adjacent to the block of interest; and generating first additional information as encoded data of the block of interest when it is determined in the step of determining that the block of interest satisfies the condition (a), generating second additional information different from the first additional information as the encoded data of the block of interest when it is determined in the step of determining that the block of interest satisfies not the condition (a) but the condition (b), and generating third additional information different from the first additional information and the second additional information as the encoded data of the block of interest when it is determined in the step of determining that the block of interest satisfies neither the condition (a) nor the condition (b).

The present invention in its fourth aspect provides a method of controlling an image encoding apparatus for encoding image data, comprising the steps of:

generating and outputting reduced image data having a size smaller than original image data of an encoding target by sampling one pixel data at a preset position in a block of 2×2 pixels of the original image data;

inputting a tile including pixel data of 2M horizontal pixels×2N vertical pixels (each of M and N is an integer not less than 2) in the original image data; and generating, for each tile, encoded data to restore three non-sampling target pixel data in each of M×N blocks in the input tile except for a sampling target pixel for generation of the reduced image data, wherein the step of generating the encoded data comprising:

defining a block in which all three non-sampling target pixels are restorable from a sampling target pixel as a flat block and a block in which at least one of three non-sampling target pixels is not restorable from a sampling target pixel as a non-flat block, determining whether all blocks in a tile of interest are flat blocks or include at least one non-flat block, and outputs flag information representing a determination result; and encoding each block line including M blocks arrayed horizontally in the tile of interest when it is determined in the step of determining that at least one block in the tile of interest is the non-flat block.

According to the present invention, it is possible to generate efficient encoded data to restore original image data from reduced image data.

Further features of the present invention will become apparent from the following description of exemplary embodiments with reference to the attached drawings.

BRIEF DESCRIPTION OF THE DRAWINGS

FIG. 5 is a view showing examples of code words of first, second, and third additional information according to the first embodiment;

FIGS. 6A and 6B are views showing examples of a process target image;

FIG. 7 is a view showing an example of the data structure of interpolation data generated according to the first embodiment;

FIG. 9 is a flowchart illustrating the processing procedure of an additional information integration unit according to the second embodiment;

FIGS. 10A, 10B, and 10C are views showing an image example and a process result example so as to explain an example of processing of the additional information integration unit according to the second embodiment;

FIG. 18 is a view showing a block of interest and neighboring pixel positions according to the sixth embodiment;

DESCRIPTION OF THE EMBODIMENTS

The embodiments of the present invention will now be described in detail with reference to the accompanying drawings.

[First Embodiment]

Figure 2:
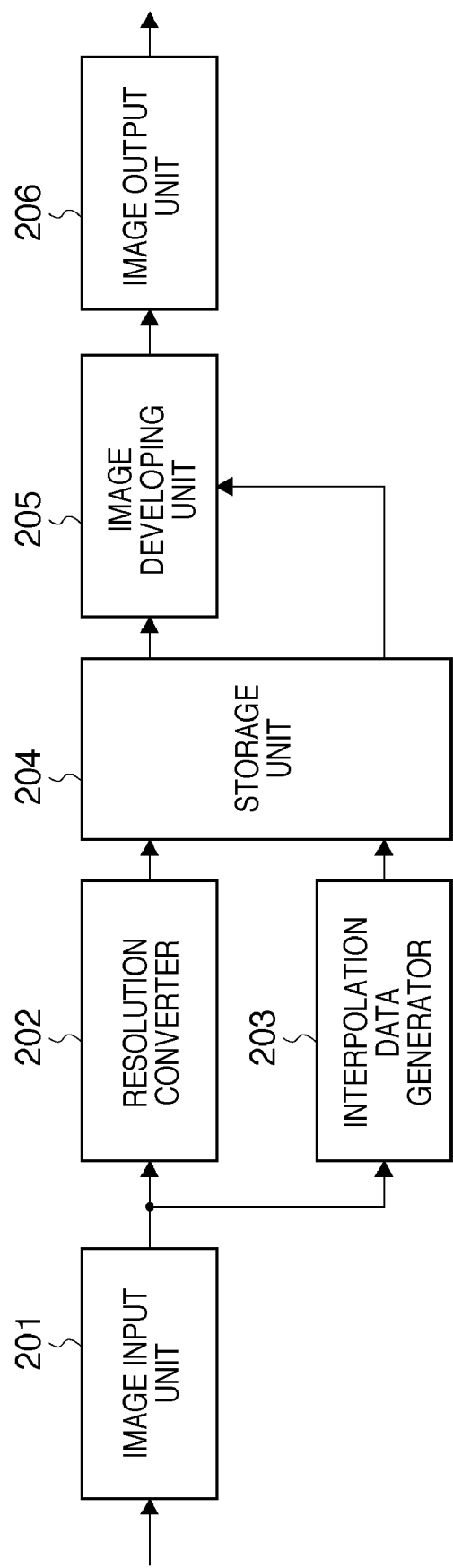
FIG. 2 is a block diagram of an image processing apparatus according to the first embodiment.

FIG. 2 is a block diagram of an image processing apparatus according to the embodiment. As is apparent from the following explanation, an example of the image processing apparatus to be described below integrates an arrangements related to image encoding and decoding. However, these arrangements may be formed as separate apparatuses.

The image processing apparatus according to this embodiment externally inputs image data to be encoded, performs resolution conversion, and generates additional information to restore the original resolution image from a reduced image. Note that the image data input source is a storage medium which stores image data as a file. However, the source may be of any other type such as an image scanner.

The encoding target image data of this embodiment is monochrome multi-valued image data containing only luminance components. The description will be made assuming that a luminance component has eight bits (256 tones from 0 to 255). However, these assumptions merely aim at simplifying the description of the embodiment. The image data may contain a plurality of components (e.g., RGB or CMYK) in a color space of any type. In addition, the number of bits of one component is not limited to eight. The number of bits may exceed eight. The encoding target image is assumed to include 2×W pixels in the horizontal direction and 2×H pixels in the vertical direction (even numbers in both directions). Note that the horizontal and vertical sizes of an actual image do not always correspond to integer multiples of 2. In such a case, processing is performed assuming that pixels having virtual fixed values exist at the ends in the horizontal and vertical directions.

Encoding processing of the image encoding apparatus shown in FIG. 2 will be described below.

First, an image input unit 201 sequentially inputs encoding target image data. Process target image data of this embodiment is a PDL rendering image. The image data are input in the raster scan order. In this embodiment, one pixel is one component. A component includes eight bits. Hence, a pixel value is a nonnegative integer value within the range of 0 to 255. Setting coordinates (0,0) at the upper left corner of an image, a pixel value at a pixel position x in the horizontal rightward direction and a pixel position y in the vertical downward direction is represented by P(x,y). For example, a pixel located at a position (x,y)=(3,4) and having a luminance value "128" is expressed as P(3,4)=128. In the following explanation, a "pixel" at the position (x,y) will also be expressed as "P(x,y)".

A resolution converter 202 performs sub-sampling of extracting one pixel from block data including 2×2 pixel data of the input image, thereby generating a reduced image. That is, the resolution converter 202 functions as a reduced image generator which generates, from original image data, a reduced image smaller than the original image.

Figure 3:
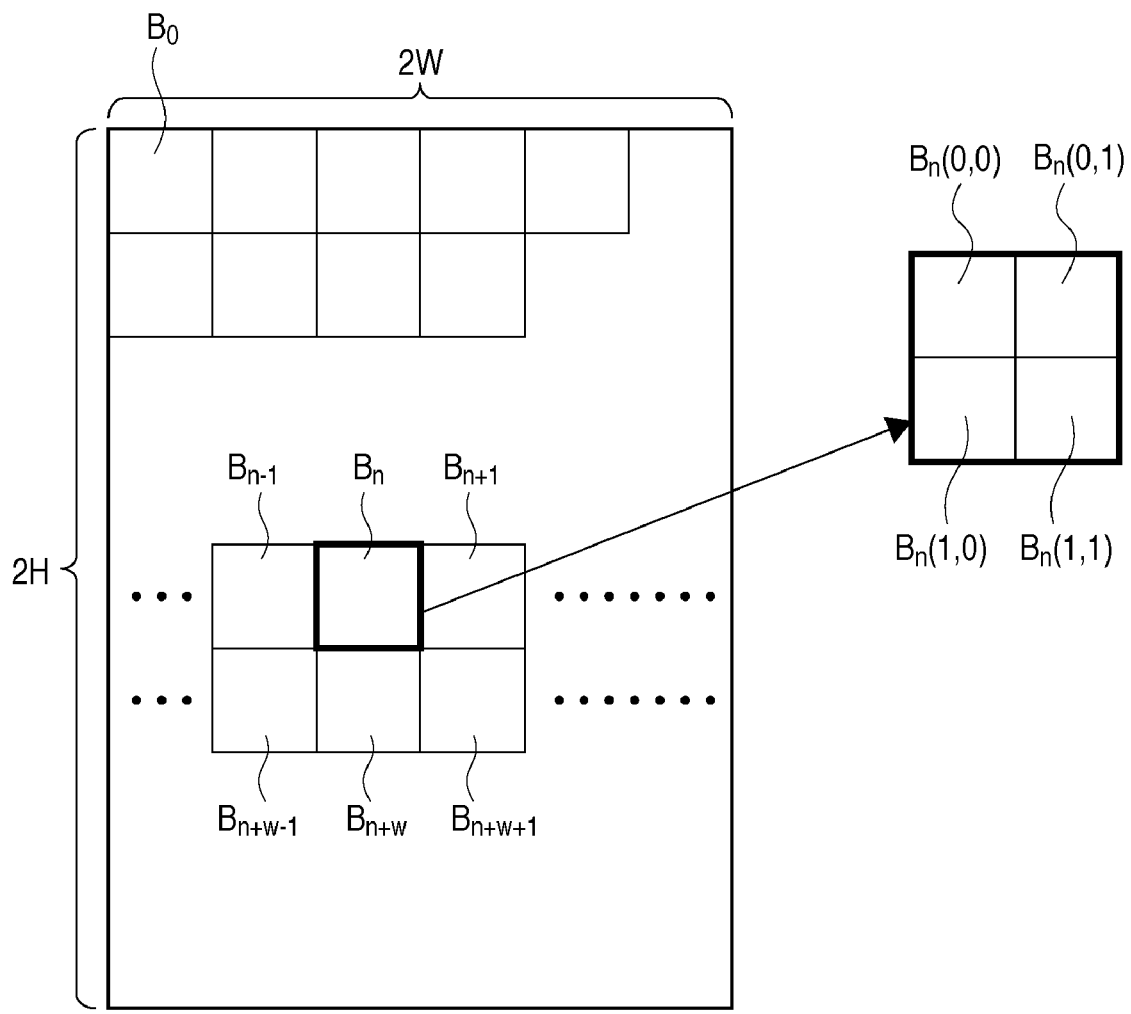
FIG. 3 is a view showing the relationship between image data and block data of 2×2 pixels according to the embodiment.

FIG. 3 shows an original image and 2×2 pixels included in a given block $B_n$ of the original image. As shown in FIG. 3, the pixels in the block B, of interest are represented by $B_n(0,0)$, $B_n(0,1)$, $B_n(1,0)$, and $B_n(1,1)$ in the raster order from the upper left position.

An immediately preceding block of the block $B_n$ of interest is expressed as $B_{n-1}$, and an immediately succeeding block is expressed as $B_{n+1}$. In this embodiment, the pixel at the position $B_n(0,0)$ of the block $B_n$ of interest, i.e., the pixel at the upper left corner of the block of interest is extracted (sub-sampled) and used as one pixel of a reduced image. The sampling is performed for all blocks $B_0$ to $B_{W*H-1}$ in the image so that a reduced image having W horizontal pixels and H vertical pixels is generated from the original image data including 2 W horizontal pixels and 2H vertical pixels. That is, the number of pixels included in the reduced image is ¼ that of the original image. The generated reduced image is output to a storage unit 204 and stored.

An interpolation data generator 203 generates information necessary for restoring the original image from the reduced image. Since one pixel in one block is sampled as one pixel of the reduced image, the remaining three pixels that are non-sampling targets need to be restored for restoration of the block. The interpolation data generator 203 of this embodiment generates, as encoded data, information representing the values of the remaining three non-sampling target pixels in each block and how to restore these pixels.

Figure 4:
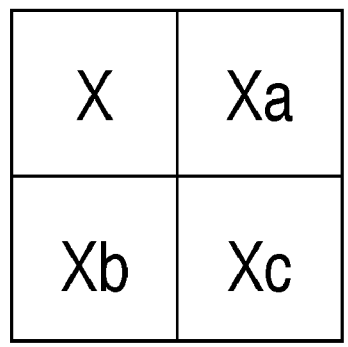
FIG. 4 is a view showing the array of 2×2 pixels in block data of interest.

FIG. 4 illustrates four pixels included in one block. The pixel X shown in FIG. 4 indicates a pixel directly used as a pixel of a reduced image. Pixels Xa, Xb, and Xc indicate restoration target pixels. The pixel at the position $B_n(0,0)$ of the block $B_n$ of interest will be expressed as X, and those at the positions $B_n(0,1)$, $B_n(1,0)$, and $B_n(1,1)$ will be expressed as Xa, Xb, and Xc hereinafter.

Figure 1:
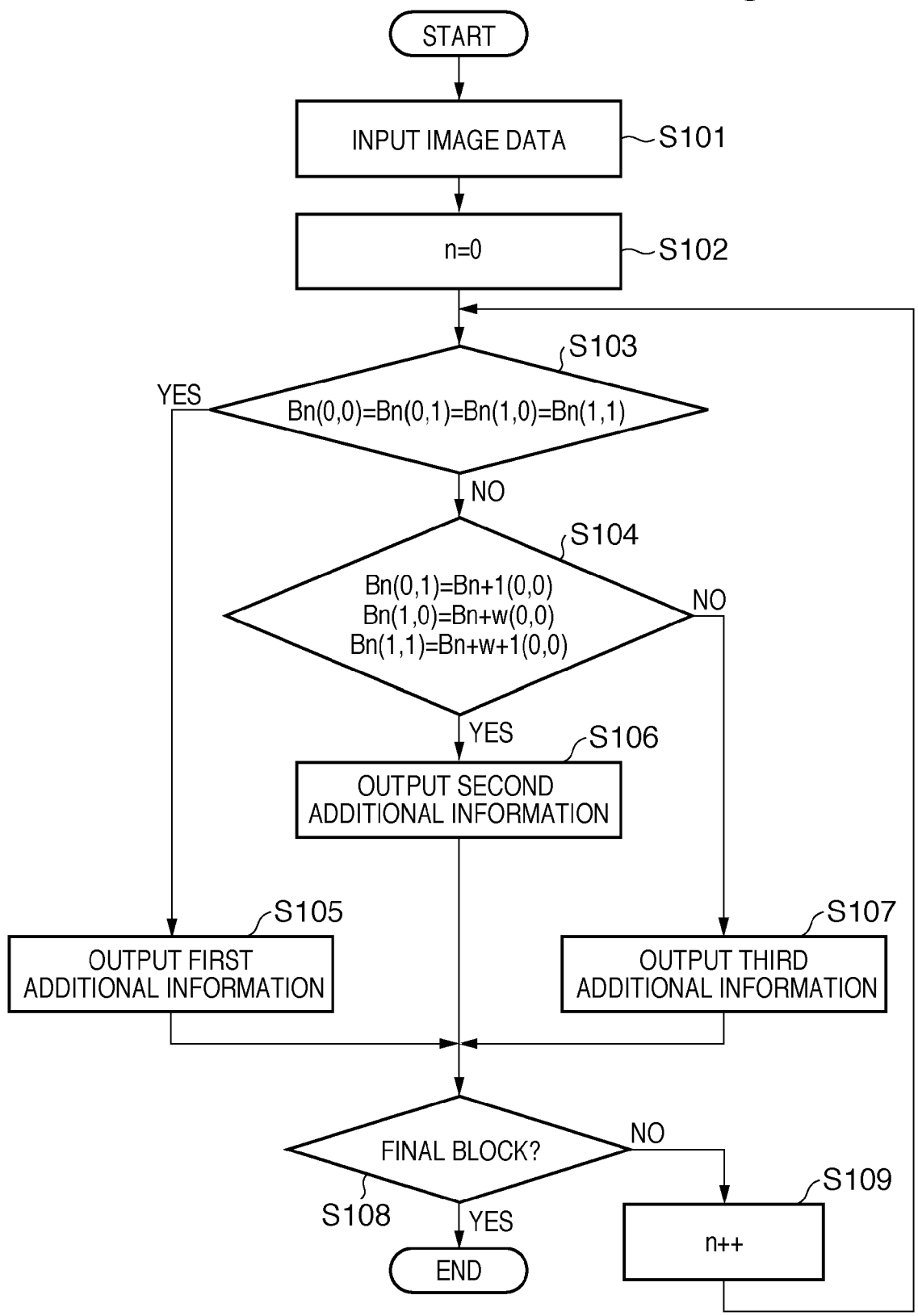
FIG. 1 is a flowchart illustrating the processing procedure of interpolation data generation according to the first embodiment.

FIG. 1 is a flowchart illustrating the processing procedure of the interpolation data generator 203 according to this embodiment. The processing procedure of the interpolation data generator 203 according to this embodiment will be explained below with reference to the flowchart of FIG. 1.

First, in step S101, the interpolation data generator 203 receives the 2×2 pixels included in the block $B_n$ of interest and one pixel from each of three blocks adjacent to the block $B_n$ of interest. The three blocks adjacent to the block $B_n$ of interest are the block $B_{n+1}$ on the right side, a block $B_{n+W}$ immediately below, and a block $B_{n+W+1}$ off to the lower right. The pixels input from these blocks are a pixel $B_{n+1}(0,0)$ from the block on the right side, a pixel $B_{n+W}(0,0)$ from the block immediately below, and a pixel $B_{n+W+1}(0,0)$ from the block off to the lower right. Note that these three pixels are used in the reduced image.

In step S102, the interpolation data generator 203 initializes a parameter n to "0". The parameter n is used to specify a block.

In step S103, the interpolation data generator 203 determines whether the four pixels in the block of interest are identical to each other. That is, the interpolation data generator 203 determines whether $$B_n(0,0)=B_n(0,1)=B_n(1,0)=B_n(1,1) \quad (1)$$

is satisfied.

If Expression (1) holds in the block $B_n$ of interest (YES), the value of the pixel X in the reduced image equals the values of the restoration target pixels Xa, Xb, and Xc. In this case, the process advances to step S105.

On the other hand, if it is determined that Expression (1) does not hold in the block $B_n$ of interest (NO in step S103), i.e., if it is determined that all the remaining three pixels Xa, Xb, and Xc cannot be restored from the pixel X in the block of interest, the process advances to step S104.

In step S104, the interpolation data generator 203 compares the pixels $B_{n+1}(0,0)$, $B_{n+W}(0,0)$, and $B_{n+W+1}(0,0)$ in the three blocks $B_{n+1}$, $B_{n+W}$, and $B_{n+W+1}$ adjacent to the block of interest with the pixels $B_n(0,1)$, $B_n(1,0)$, and $B_n(1,1)$ in the block of interest, and determines whether $$B_n(0,1)=B_{n+1}(0,0), \text{ and}$$

$$B_n(1,0)=B_{n+W}(0,0), \text{ and}$$

$$B_n(1,1)=B_{n+W+1}(0,0) \quad (2)$$

is satisfied.

Note that the pixels $B_{n+1}(0,0)$, $B_{n+W}(0,0)$, and $B_{n+W+1}(0,0)$ are pixels sampled from the blocks $B_{n+1}$, $B_{n+W}$, and $B_{n+W+1}$, respectively, to generate the reduced image, as described above.

There is a reason to determine the coincidence/non-coincidence of the pairs {$B_n(0,1)$, $B_{n+1}(0,0)$}, {$B_n(1,0)$, $B_{n+W}(0,0)$}, and {$B_n(1,1)$, $B_{n+W+1}(0,0)$}, as indicated by Expression (2).

In general, a pixel of interest and pixels adjacent to it on the upper, lower, left, and right sides have high correlations, and this applies to many images. Hence, to predict the pixel value of a pixel of interest, adjacent pixels are often used as reference pixels for prediction. However, the determination in step S104 is not performed for a block of interest in which "the four pixels are identical to each other". Experiments have revealed that in such a case, the correlations of the pairs {$B_n(0,1)$, $B_{n+1}(0,0)$}, {$B_n(1,0)$, $B_{n+W}(0,0)$}, and {$B_n(1,1)$, $B_{n+W+1}(0,0)$} increase at high probability.

For this reason, the coincidence between $B_n(0,1)$ and $B_{n+1}(0,0)$ is determined. The remaining pairs {$B_n(1,0)$, $B_{n+W}(0,0)$} and {$B_n(1,1)$, $B_{n+W+1}(0,0)$} are compared due to the same reason. If Expression (2) described above is satisfied (if the pixels of the three pairs are identical to each other), a short code word is assigned to decrease the information amount.

When the interpolation data generator 203 has determined in step S104 that Expression (2) holds, the pixels Xa, Xb, and Xc in the block $B_n$ of interest can be reproduced directly from the pixels of the reduced image. The pixel Xa can be reproduced using a pixel $X_{n+1}$ (n=0, 1, ..., X×H−1) of the reduced image. The pixel Xb can be reproduced using a pixel $X_{n+W}$ of the reduced image. The pixel Xc can be reproduced using a pixel $X_{n+W+1}$ of the reduced image.

However, when the block $B_n$ of interest is located at the right end of the image, there are no target pixels to be compared with the pixels $B_n(0,1)$ and $B_n(1,1)$. When the block $B_n$ of interest is located at the lower end of the image, there are no target pixels to be compared with the pixels $B_n(1,0)$ and $B_n(1,1)$. Especially, when the block $B_n$ of interest is located at the lower right corner of the image, there are no target pixels to be compared with the pixels $B_n(0,1)$, $B_n(1,0)$, and $B_n(1,1)$. In these cases, comparison is done assuming that the nonexistent pixels have an appropriate value, e.g., "255". Note that this value need only be identical to that in a decoding apparatus and can be any value within the range of 0 to 255.

If the condition of Expression (2) is determined to hold (YES) in the above-described way, the process advances to step S106.

If neither Expression (1) nor Expression (2) holds for the block $B_n$ of interest, the pixels Xa, Xb, and Xc of the block of interest cannot be restored from the reduced image. In this case, the process advances to step S107.

In step S105, the interpolation data generator 203 outputs first additional information for the block of interest as encoded data. The first additional information need only represent that three pixels are generated from a pixel of interest of the reduced image, i.e., "simple enlargement" is performed to restore the original image. One bit having a value "1" is output as the first additional information, as shown in FIG. 5.

Note that to actually generate the original image by enlarging the reduced image on the decoding apparatus side, letting P(x,y) be the pixel of interest in the reduced image, the pixels X, Xa, Xb, and Xc of the enlarged block $B_n$ of interest are obtained by $$X=Xa=Xb=Xc=P(x,y)$$

In step S106, the interpolation data generator 203 outputs second additional information for the block of interest as encoded data. The second additional information need only represent that three pixels adjacent to a pixel of interest of the reduced image are used to restore the original resolution. In this case, 2-bit data "01" is output as the second additional information (encoded data), as shown in FIG. 5.

To actually generate the original image by enlarging the reduced image, letting P(x,y) be the pixel of interest in the reduced image, the pixels X, Xa, Xb, and Xc of the enlarged block $B_n$ of interest are obtained by $$X=B_n(0,0)=P(x,y)$$

$$Xa=B_n(0,1)=P(x+1,y)$$

$$Xb=B_n(1,0)=P(x,y+1)$$

$$Xc=B_n(1,1)=P(x+1,y+1)$$

When the process advances to step S107, this indicates that the pixels Xa, Xb, and Xc of the block $B_n$ of interest cannot be reproduced from the reduced image. In the first embodiment, the interpolation data generator 203 outputs third additional information in this case. As shown in FIG. 5, the third additional information starts with two bits "00" so as to be discriminable from the first and second additional information, and subsequently outputs 24 bits representing the pixel values of the pixels $B_n(0,1)$, $B_n(1,0)$, and $B_n(1,1)$.

Note that in this embodiment, the first to third additional information shown in FIG. 5 are used. However, these are merely examples. When the first additional information is represented by one bit, the second additional information need only be formed from two bits in which the first bit has a value different from the first additional information. The third additional information need only include two bits, in which the first bit has the same value as the first bit of the second additional information but the second value has a different value, and data representing three pixels.

According to the above-described processing procedure, the interpolation data generator 203 outputs one of the first, second, and third additional information for the block of interest.

In step S108, the interpolation data generator 203 determines whether the block of interest is the last block (the block at the lower right corner of the image). If NO in step S108, the variable n is incremented by "1" in step S109, and the process returns to step S103. Upon determining in step S108 that the block of interest is the final block (the block at the lower right corner of the image), the processing ends.

The above-described method enables to generate additional information capable of restoring the original resolution image. In other words, the interpolation data generator 203 of this embodiment is an additional information generator for generating the first to third additional information.

Detailed processing will be described using image examples shown in FIGS. 6A and 6B.

In the image of FIG. 6A, place focus on a block $B_0$. Since $B_0(0,0)=B_0(0,1)=B_0(1,0)=B_0(1,1)$ holds, first additional information "1" is output. In blocks $B_1$, $B_2$, and $B_3$ as well, Expression (1) holds, like the block $B_0$. Hence, the first additional information is output for all blocks. The stream of the additional information (interpolation data) for the four blocks is represented by four bits "1111".

For this reason, in the image of FIG. 6A, the reduced image includes 2×2 pixels, and the data size of the reduced image is 4×8 bits. Hence, the data amount of the reduced image and its additional information is 4×8+4=36 bits. Since the size of the original image is 128 bits (=4×4×8), the compression ratio is 36/128=9/32.

In the image of FIG. 6B, place focus on the block $B_0$. In this case, $B_0(0,0) \neq B_0(0,1) \neq B_0(1,0) \neq B_0(1,1)$, and Expression (1) does not hold.

However, $B_0(0,1)=B_1(0,0)$, $B_0(1,0)=B_2(0,0)$, and $B_0(1,1)=B_3(0,0)$ is satisfied. That is, Expression (2) holds. Hence, second additional information (two bits "01") is output for the block $B_0$ of interest.

Examine a case in which the block of interest moves to $B_1$. In the block $B_1$ of interest, $B_1(0,0)=B_1(0,1) \neq B_1(1,0)=B_1(1,1)$. Hence, the process advances to determination of coincidence/non-coincidence of neighboring pixels. That is, Expression (2) is verified.

Since the block $B_1$ of interest is located at the right end of the image, comparison with a predetermined pixel value ("255" in the embodiment) is done when referring to the neighboring pixels. As a result of comparison, $B_1(0,1) \neq 255$, $B_1(1,0)=B_3(0,0)$, and $B_1(1,1) \neq 255$. Since the pixels cannot be reproduced by the second additional information, the third additional information is output. More specifically, two bits "00" and, subsequently, 24-bit data representing the pixel data of the three pixels are output as the third additional information.

The same processing is performed for the blocks $B_2$ and $B_3$ as well. The third additional information is output for the block $B_2$ because it satisfies neither Expression (1) nor Expression (2). The first additional information is output for the block $B_3$ because it satisfies Expression (1).

After processing all blocks of the image in FIG. 6B, the interpolation data generator 203 outputs interpolation data having a data structure shown in FIG. 7. The data structure shown in FIG. 7 is merely an example. The interpolation data need only include one of the first, second, and third additional information for at least one block.

The storage unit 204 stores the reduced image data thus generated by the resolution converter 202 and the interpolation data thus generated by the interpolation data generator 203.

An image developing unit 205 restores the original resolution image from the reduced image data and the interpolation data stored in the storage unit 204. Image developing is done by processing reverse to the interpolation data generation processing. More specifically, the interpolation data is analyzed, and the unknown three pixels Xa, Xb, and Xc in the block are obtained from the pixel of interest of the reduced image based on the analyzed additional information by one of the following three methods:
(1) the pixels are obtained by simply enlarging the pixel of interest in the reduced image,
(2) the pixels are obtained from the pixels adjacent to the pixel of interest in the reduced image, and
(3) the pixels are obtained from the pixel values contained in the interpolation data.

More specifically, when the additional information for the pixel P(x,y) of interest in the reduced image is "1", the pixel of interest of the reduced image is directly used as the pixels Xa, Xb, and Xc, thereby restoring the block.

If the additional information for the pixel P(x,y) of interest in the reduced image is "01", the pixel Xa is reproduced using the pixel P(x+1,y), the pixel Xb is reproduced using the pixel P(x,y+1), and the pixel Xc is reproduced using the pixel P(x+1,y+1). However, when the pixel P(x,y) of interest is located at the right end of the image, Xa=255, and Xc=255. When the pixel P(x,y) of interest is located at the lower end of the image, Xb=255, and Xc=255. Especially, when the pixel P(x,y) of interest is located at the lower right corner of the image, Xa=Xb=Xc=255.

If the additional information for the pixel P(x,y) of interest in the reduced image is "00", the pixels are reproduced assuming that 3-byte (24-bit) data following the additional information are arranged in the order of the pixels Xa, Xb, and Xc.

By repeating the above processing, the original resolution image data can be restored. The restored original resolution image is input to an image output unit 206.

The image output unit receives the image output from the image developing unit 205 and outputs the restored image data outside the image processing apparatus (e.g., to a printer or a display device).

As described above, the image processing apparatus according to this embodiment generates interpolation data for restoring the original resolution image from the reduced image simultaneously with resolution conversion of the input image. According to the encoding processing of this embodiment, it is possible to easily generate interpolation data in a smaller data amount for an office document image (an image including only characters or lines). This enables complete lossless restoration of the original resolution image.

In this embodiment, the present invention is applied to a single apparatus having both an image encoding function and a decoding function. However, these functions may be implemented by separate apparatuses. When applying to a single image encoding apparatus, reduced image data and interpolation data are output as one file. A single decoding apparatus first develops the reduced image from the file onto a memory and then restores (decodes) the original image based on the interpolation data. A more detailed description will be omitted.

The description of the first embodiment will be finished here. In this embodiment, a reduced image having a ½ size in both the horizontal and vertical directions is generated from an original image by sampling. Simultaneously, interpolation data is generated. Recursively inputting the reduced image as an original image may be repeated. In this case, a first-step reduced image and first-step interpolation data of an original image are obtained. A second-step reduced image (having a size ¼ that of the original image in both the horizontal and vertical directions) and second-step interpolation data are obtained from the first-step reduced image, . . . , and an nth-step reduced image and nth-step interpolation data are obtained. Eventually, nth-step reduced image+nth-step interpolation data+(n−1)th-step interpolation data+ . . . +first-step interpolation data are generated. This method is noticeable because it can generate encoded data capable of losslessly reproducing images of various sizes.

Note that in the above-described embodiment, the sampling target for reduced image generation is the pixel at the upper left corner of each block. However, the sampling target may be set for any one of 2×2 pixels.

It may be unnecessary to explain the first additional information. Assume that when generating the second additional information, the pixel X at the lower right corner of the block of interest is set as the sampling target, and the remaining three pixels are expressed as Xa, Xb, and Xc, as described above. Let X1 be the sampling target pixel included in an adjacent block and located adjacent to the pixel Xa so as to be referred to restore the pixel Xa, X2 be the sampling target pixel included in another adjacent block and located adjacent to the pixel Xb so as to be referred to restore the pixel Xb, and X3 be the sampling target pixel included in still another adjacent block and located adjacent to the pixel Xc so as to be referred to restore the pixel Xc. In this case, if Xa=X1, and Xb=X2, and Xc=X3 are satisfied, the second additional information is generated.

[Modification of First Embodiment]

An example in which a computer program implements the same processing as in the first embodiment will be explained below as a modification of the first embodiment.

Figure 14:
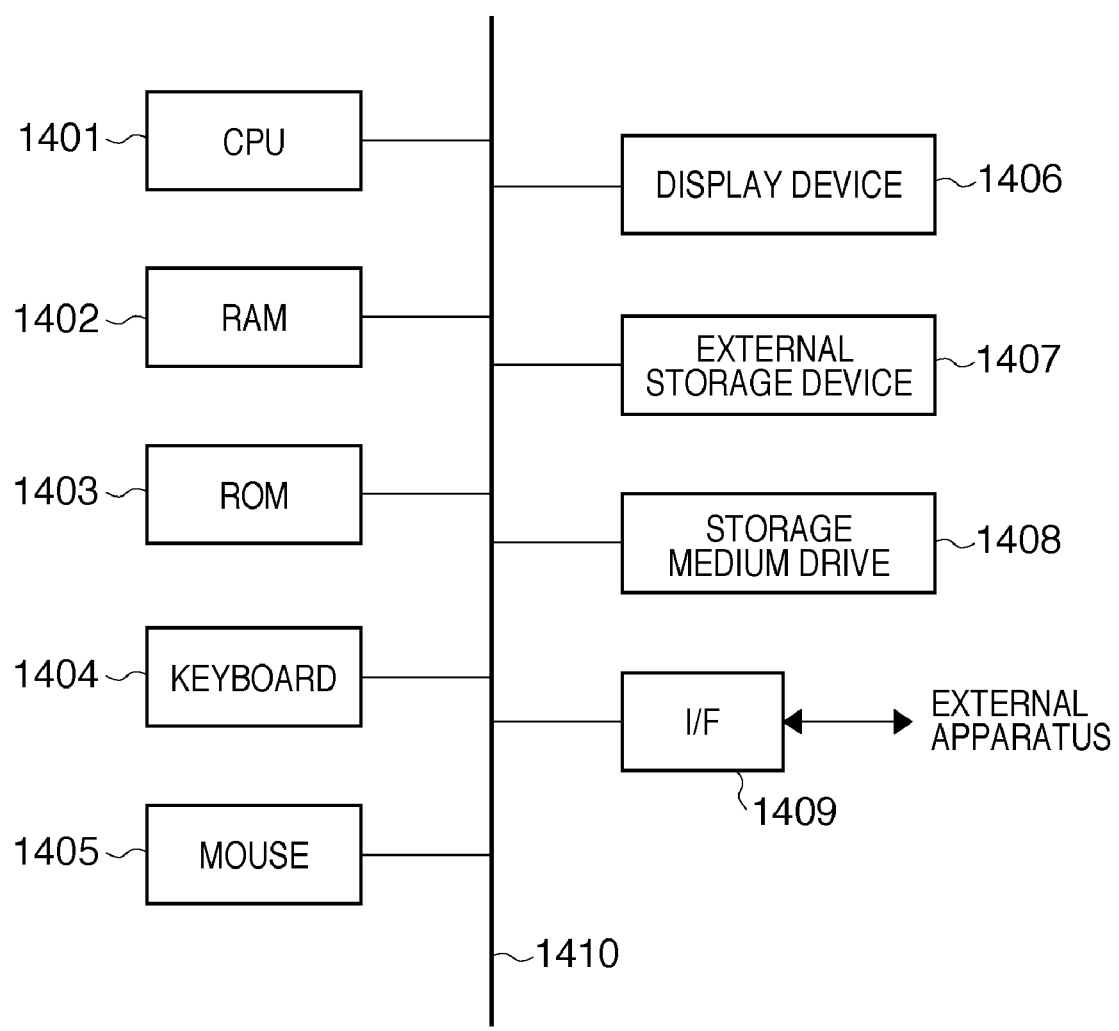
FIG. 14 is a block diagram of a computer which implements the image processing apparatus according to the embodiment.

FIG. 14 is a block diagram of an information processing apparatus (e.g., personal computer) according to the modification.

Referring to FIG. 14, a CPU 1401 controls the overall apparatus using programs and data stored in a RAM 1402 and a ROM 1403 and also executes image encoding processing and decoding processing to be described later. The RAM 1402 has an area to store programs and data downloaded from an external storage device 1407 or a storage medium drive

1408 or from an external apparatus via an I/F 1409. The RAM 1402 also has a work area to be used by the CPU 1401 to execute various kinds of processing. The ROM 1403 stores a boot program and the setting programs and data of the apparatus. A keyboard 1404 and a mouse 1405 can input various instructions to the CPU 1401.

A display device 1406 is formed from, e.g., a CRT or a liquid crystal screen and can display information such as an image or a text. The external storage device 1407 is a mass storage such as a hard disk drive. The external storage device 1407 stores, as files, an OS (operating system), programs for image encoding and decoding processing to be described later, encoding target image data, encoded data of decoding target images, and the like. The CPU 1401 loads the programs and data to a predetermined area on the RAM 1402 and executes them.

The storage medium drive 1408 reads out programs and data from a storage medium such as a CD-ROM or a DVD-ROM and outputs them to the RAM 1402 or the external storage device 1407. Note that the storage medium may store programs for image encoding and decoding processing to be described later, encoding target image data, encoded data of decoding target images, and the like. In this case, the storage medium drive 1408 loads the programs and data to a predetermined area on the RAM 1402 under the control of the CPU 1401.

The I/F 1409 connects an external apparatus to this apparatus to enable data communication between them. For example, encoding target image data or encoded data of a decoding target image can be input to the RAM 1402, the external storage device 1407, or the storage medium drive 1408 of the apparatus. A bus 1410 connects the above-described units.

In the above arrangement, when the apparatus is powered on, the CPU 1401 loads the OS from the external storage device 1407 to the RAM 1402 in accordance with the boot program in the ROM 1403. This enables input from the keyboard 1404 or the mouse 1405 and allows the display device 1406 to display a GUI. When the user operates the keyboard 1404 or the mouse 1405 and inputs an instruction to activate an image encoding processing application program stored in the external storage device 1407, the CPU 1401 loads the program to the RAM 1402 and executes it. This makes the apparatus function as an image encoding apparatus. In this case, the encoding application performs the processing of generating a reduced image by sampling one pixel in each above-described block of designated image data and the interpolation data generation processing (the flowchart in FIG. 1). The result is stored in a storage device such as a hard disk as a file or transferred to an external apparatus or a network.

[Second Embodiment]

In the first embodiment, sampling is performed in each block including 2×2 pixels, and interpolation data is generated by selectively deciding additional information. In this case, a 1-bit code word (first additional information) is assigned to three pixels at the minimum. In the second embodiment, an example will be described in which the first embodiment is further expanded to attain a higher encoding efficiency.

Note that in the second embodiment as well, encoding target image data is assumed to be monochrome multi-valued image data including eight bits per pixel (256 tones), for the descriptive convenience. However, the encoding target image data may contain a plurality of color components (e.g., RGB, YMCK, or Lab). The number of bits of one component is not limited to eight. If there are a plurality of color components, the same processing is performed for each component.

In the second embodiment, a "block" represents 2×2 pixels, as in the first embodiment. A "tile" has a size corresponding to M blocks in the horizontal direction and N blocks in the vertical direction (each of M and N is an integer of 2 or more). For the descriptive convenience, M=N=8 in one tile. That is, one tile includes 16×16 pixels. For the descriptive convenience, the encoding target image data is assumed to have 16 W horizontal pixels×16 H vertical pixels. That is, the number of pixels is an integer multiple of 16 in both directions.

Figure 8:
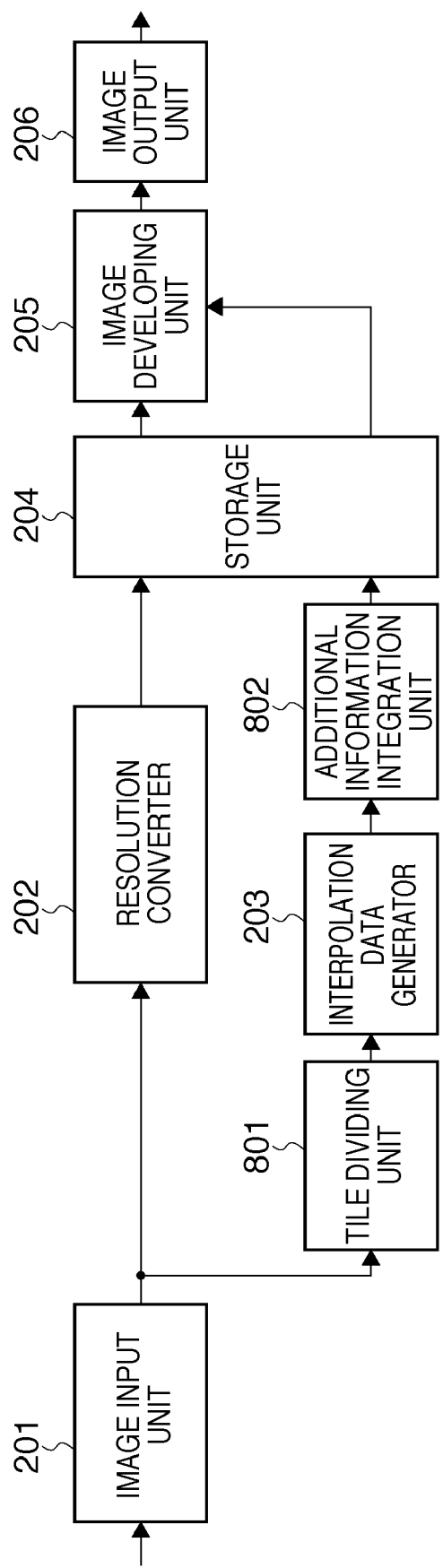
FIG. 8 is a block diagram of an image processing apparatus according to the second embodiment.

FIG. 8 is a block diagram of an image encoding apparatus according to the second embodiment. A tile dividing unit 801 is provided before an interpolation data generator 203, and an additional information integration unit 802 is provided after the interpolation data generator 203, unlike FIG. 2. Except those, the arrangement is the same as in the first embodiment, and a description thereof will not be repeated.

The tile dividing unit 801 divides image data received from an image input unit 201 into tiles each having 16×16 pixels, and outputs the tile image data to the interpolation data generator 203. Note that since the interpolation data generator 203 generates interpolation data of each tile by referring to the outer pixel data of the tile, the tile dividing unit 801 outputs, to the interpolation data generator 203, pixel data with an extra column on the right side of the tile and an extra line on the lower side of the tile. The pixel data of one column and one line is output from the tile dividing unit 801 as an overlap portion between tiles.

The interpolation data generator 203 receives every 2×2 pixel unit of the input tile and generates interpolation data in accordance with the procedure described in the first embodiment.

The additional information integration unit 802 functions as an encoded data input unit for receiving encoded data from the interpolation data generator 203. For this purpose, the additional information integration unit 802 incorporates a buffer memory. The additional information integration unit 802 receives the encoded data (interpolation data) generated by the interpolation data generator 203, temporarily stores them in the internal buffer, analyzes the interpolation data of one tile, i.e., 8×8 interpolation data, and integrates them. The process contents of the additional information integration unit 802 will be described below in more detail.

First, the additional information integration unit 802 analyzes 8×8 pieces of additional information included in an input tile of interest. Based on the analysis result, the additional information integration unit 802 executes first integration processing and second integration processing to be explained below.

<First Integration Processing>

This processing is performed when the 8×8 pieces of additional information in the tile of interest are identical to each other. There are three kinds of additional information, i.e., first, second, and third additional information, as described in the first embodiment. When 8×8 pieces of additional information are identical to each other, they are integrated. For example, if 8×8 pieces of additional information in a tile of interest are identical, the additional information integration unit 802 outputs, at the top, one identification bit "1" representing that the pieces of information are identical to each other. The additional information integration unit 802 subsequently outputs the additional information, and ends the integration processing of the tile of interest. Hence, the identification bit can also be regarded as flag information representing whether integration has succeeded.

If the pieces of additional information of the 8×8 blocks in the tile of interest are "1", i.e., the first additional information in the first embodiment, the integration result of the tile of interest is represented by two bits "11". If the pieces of additional information of the 8×8 blocks in the tile of interest are "01", i.e., the second additional information in the first embodiment, the integration result of the tile of interest is represented by three bits "101". If all blocks in the tile of interest have the third additional information, the integration result of the tile of interest is represented by three bits "100".

When the pieces of additional information of all blocks in the tile of interest are the third additional information, the pixel value of each block is output following the three bits "100" representing the integration result (the additional information of each block is unnecessary). In this embodiment, one tile=8×8 blocks. Since each block has three restoration target pixels (FIG. 4), 8×8×3 pixels (bytes) follow the three bits "100" of the integration result.

As described above, when all pieces of additional information of the 8×8 blocks in the tile of interest are identical, additional information integration processing for the tile of interest is ended in the above-described way (second integration processing to be described next is not performed).

On the other hand, if at least one of the 8×8 pieces of additional information in the tile of interest is different, an identification bit representing it is output, and second integration processing to be described below is performed.

<Second Integration Processing>

The second integration processing is performed when at least one of all pieces of additional information in a tile is different from others. In other words, there is possibility that pieces of additional information can be integrated in a region smaller than the tile size. In the second embodiment, noting that one tile includes 8×8 pieces of additional information, integration processing is performed for each line of eight pieces of additional information arrayed in the horizontal direction. The eight pieces of additional information arrayed in the horizontal direction will be referred to as line additional information hereinafter.

In the second integration processing, it is determined whether eight pieces of additional information included in line additional information of interest are identical to each other. If they are identical, the additional information integration unit 802 outputs one identification bit "1" to identify it and, subsequently, one piece of additional information determined to be identical. On the other hand, if at least one of the eight pieces of additional information included in the line additional information of interest is different, the additional information integration unit 802 outputs one identification bit "0" and, subsequently, the eight pieces of additional information.

Since the tile of interest includes eight pieces of line additional information, the above processing is executed eight times from the uppermost line to the lowermost line.

The processing of the additional information integration unit 802 according to the second embodiment has been described above.

FIG. 9 is a flowchart illustrating the integration processing procedure of the additional information integration unit 802 according to the second embodiment. The processing of the additional information integration unit 802 of this embodiment will be explained below with reference to the flowchart in FIG. 9.

First, the additional information integration unit 802 receives 8×8 pieces of additional information, included in a tile of interest, generated by the interpolation data generator 203 (step S901).

The additional information integration unit 802 then analyzes the received additional information and determines whether all the 8×8 pieces of additional information (all encoded data) are of the same type (one type) (step S902). Upon determining that all pieces of additional information are of the same type (YES), the process advances to step S903. In step S903, the additional information integration unit 802 outputs a 1-bit flag "1" representing that the pieces of additional information of the tile of interest are integrated. In step S904, the additional information integration unit 802 outputs one piece of additional information following the flag. Note that if all the pieces of additional information determined to be identical are third additional information, the additional information integration unit 802 outputs 8×8×3 pixel data following the third additional information.

If NO in step S902, i.e., if at least two kinds of additional information exist in the 8×8 pieces of additional information included in the tile of interest, the process advances to step S905. In step S905, the additional information integration unit 802 outputs a 1-bit flag "0" representing that the pieces of additional information of the tile of interest are not integrated. In steps S906 to S911, the additional information integration unit 802 executes integration processing in each region smaller than the tile of interest. Actually, this is block line integration processing for each block line including eight pieces of additional information arrayed in the horizontal direction.

First, the additional information integration unit 802 determines in step S906 whether all the eight pieces of additional information included in line additional information of interest (the additional information of the uppermost line of the tile of interest at the initial stage) are identical. If they are identical, the pieces of additional information of that line can be integrated. The additional information integration unit 802 outputs, in step S907, a 1-bit flag "1" representing that they are integrated, and then in step S908, one piece of additional information determined to be identical. Note that if the pieces of additional information determined to be identical are the third additional information, 8×3 pixel data are output following the additional information.

If it is determined in step S906 that at least one of all pieces of additional information of the line of interest (the uppermost line of the tile of interest at the initial stage) is different from others, the process advances to step S909. The additional information integration unit 802 outputs, in step S909, a 1-bit flag "0" representing that the pieces of additional information of that line cannot be integrated, and then in step S910, the eight pieces of additional information (if the third additional information exists, three pixel data follow the third additional information).

In step S911, the additional information integration unit 802 determines whether the integration processing has been done up to the final line of the tile of interest. If NO in step S911, the process returns to step S906 to perform integration processing of the next line.

When the integration processing of the tile of interest has ended in the above-described manner, the additional information integration unit 802 determines in step S912 whether the integration processing has been done for all tiles. If NO in step S912, the process returns to step S901 to perform integration processing of the additional information of the next tile.

An example of integration processing of the additional information of one tile will be described here with reference to FIGS. 10A to 10C.

FIG. 10A illustrates the image data of one tile. One cell enclosed by broken lines indicates one pixel.

In FIG. 10A, the regions of the first to ninth lines include white pixels of the same value. The regions of the 10th and 11th lines include black pixels of the same value. The regions of the 12th to 16th lines include white pixels of the same value. The pattern illustrated in FIG. 10A is often observed in a character or line image.

FIG. 10B shows the values of the additional information of the respective blocks generated by the interpolation data generator 203 upon receiving the tile image data shown in FIG. 10A.

As shown in FIG. 10B, not all pieces of additional information in the tile are identical. Hence, the flag "0" representing that tile integration is impossible is output, as shown in FIG. 10C (step S905 in FIG. 9).

See the first line additional information. The eight pieces of additional information are "1". Since line integration is possible, the flag "1" is output, and then, the additional information "1" is output. This processing is repeated hereafter.

For the tile image shown in FIG. 10A, the additional information integration unit 802 eventually outputs an additional information integration result shown in FIG. 10C. The bit sequence is "0;11;11;11;11;101;101;11;11"
Note that the semicolons indicate breaks of line additional information integration to give a better understanding but do not exist in fact.

Since the tile in FIG. 10A includes 8×8 blocks each having three pixels to be restored, one tile includes 8×8×3 restoration target pixels. That is, the total number of bits of the restoration target pixels in one tile is 8×8×3×8 bits=1536 bits.

The pieces of additional information in FIG. 10B include a total of 48 pieces of 1-bit additional information and a total of 16 pieces of 2-bit additional information. Hence, the total number of bits of additional information in one tile is 48+16×2 bits=80 bits (corresponding to the first embodiment).

In FIG. 10C, the total number of bits after integration of additional information in one tile according to the second embodiment is 19 bits including the flag bits. That is, it is possible to largely decrease the data amount of the interpolation data.

As described above, according to the second embodiment, it is determined whether the pieces of additional information generated by the interpolation data generator 203 for the blocks each having 2×2 pixels continue in a predetermined unit. If the pieces of additional information continue, they are integrated, thereby largely decreasing the data amount of the interpolation data. If the pieces of additional information do not continue, the continuity is determined in a smaller unit, and integration processing is performed in the same way. Since the continuity of additional information is only checked, it is unnecessary to scan the image again for integration processing. Hence, the efficiency of interpolation data generation processing does not lower.

Note that a computer program can also implement the same processing as in the second embodiment, as is apparent from the above-described modification of the first embodiment, and a description thereof will not be repeated.

[Third Embodiment]

In the first and second embodiments, one of first, second, and third additional information is assigned to one block (2×2 pixels), thereby generating the interpolation data of the block. In the third embodiment, an example will be described in which interpolation data is generated without limiting the number of types of additional information to three.

Note that in the third embodiment as well, encoding process target image data is assumed to be monochrome multi-valued image data. This embodiment is also applicable to RGB image data or CMYK color image data. The image is assumed to include 16 W horizontal pixels×16 H vertical pixels (the number of pixels is an integer multiple of 16 in both the horizontal and vertical directions).

Figure 11:
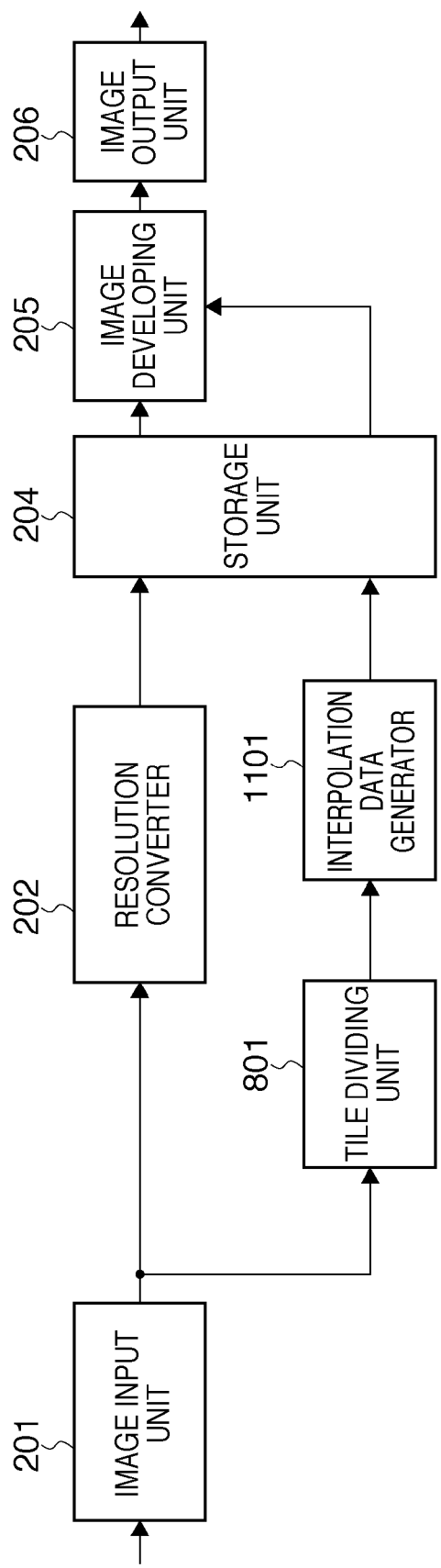
FIG. 11 is a block diagram of an image processing apparatus according to the third embodiment.

FIG. 11 is a block diagram of an image encoding apparatus according to the third embodiment. The same reference numerals as in FIGS. 1 and 8 described in the first and second embodiments denote the same blocks in FIG. 11, and a description thereof will not be repeated.

Parts whose operations are different from the second embodiment will be explained below.

In the above-described second embodiment, after generation of additional information for a block of 2×2 pixels, additional information integration processing is performed. In the third embodiment, a method of generating interpolation data while adaptively changing the additional information generation unit will be described. To do this, the additional information integration unit 802 in FIG. 8 is removed, and an interpolation data generator 1101 of the third embodiment is provided in place of the interpolation data generator 203 of the first and second embodiments.

Figure 12:
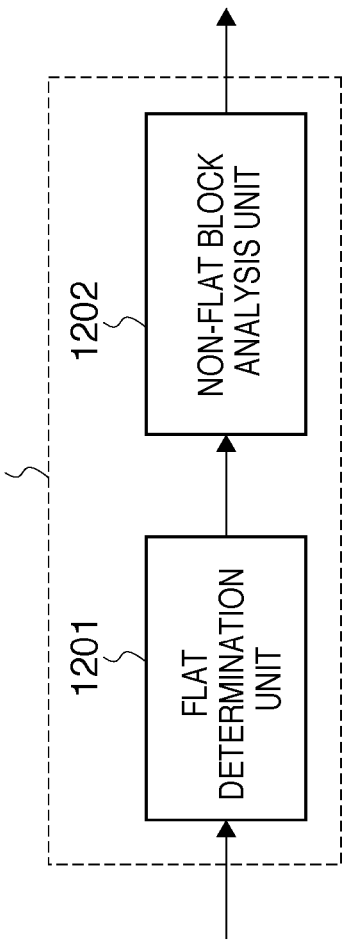
FIG. 12 is a block diagram of an interpolation data generator according to the third embodiment.

FIG. 12 is a block diagram of the interpolation data generator 1101 according to the third embodiment. The interpolation data generator 1101 includes a flat determination unit 1201 and a non-flat block analysis unit 1202.

In the following explanation, a block whose pixels Xa, Xb, and Xc (FIG. 4) are restorable from a pixel X in a reduced image will be referred to as a "flat block". In other words, a block whose 2×2 pixels have equal values (identical colors) is called a flat block. Additionally, a block in which 2×2 pixels include at least one pixel having a value different from the others will be referred to as a non-flat block. A tile including only flat blocks will be referred to as a flat tile. A tile having at least one non-flat block will be referred to as a non-flat tile. Eight blocks arrayed horizontally in one tile will be referred to as a block line. A block line formed from eight flat blocks will be referred to as a flat block line. A block line including at least one non-flat block will be referred to as a non-flat block line. In the third embodiment, neighboring reference target pixels outside a tile are assumed to have a pixel value "255".

The flat determination unit 1201 functions as a tile encoder which receives and encodes the image data of each tile formed from 2M horizontal pixels×2N vertical pixels. For the descriptive convenience, M=N=8. Placing focus on each block (2×2 pixels) of an input tile (16×16 pixels), the flat determination unit 1201 determines whether the pixels Xa, Xb, and Xc other than the pixel X used for the reduced image can simply be restored from the pixel X in the reduced image. The flat determination unit 1201 executes processing based on the determination result.

Based on the determination result of the flat determination unit 1201, the non-flat block analysis unit 1202 generates additional information in accordance with the number and arrangement of colors in the block and outputs it.

The process contents of the flat determination unit 1201 and then those of the non-flat block analysis unit 1202 will be described below.

<Description of Flat Determination Unit>

Figure 13:
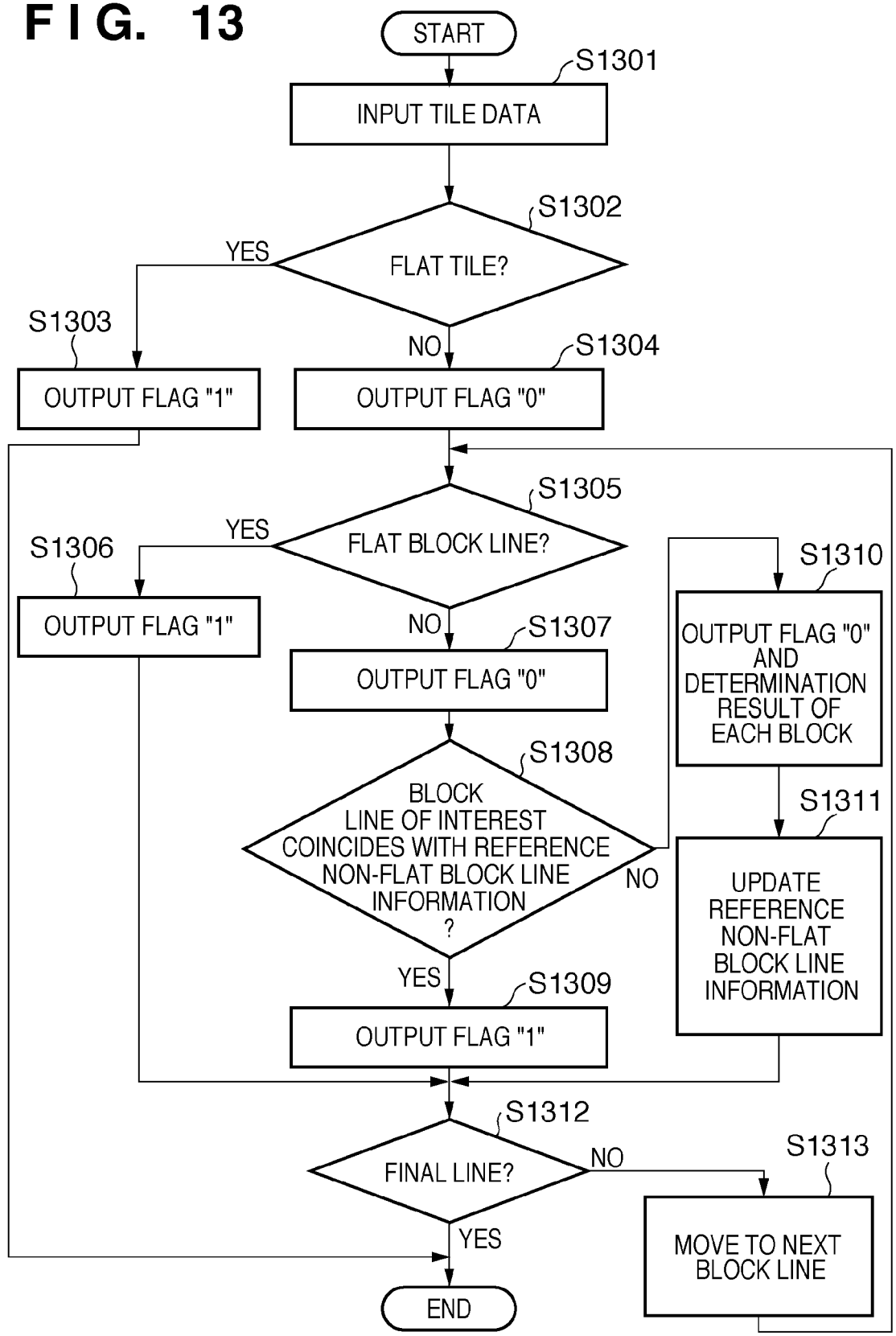
FIG. 13 is a flowchart illustrating the processing procedure of a flat determination unit according to the third embodiment.

FIG. 13 is a flowchart illustrating the processing procedure of the flat determination unit 1201.

In step S1301, the flat determination unit 1201 receives image data (tile data) of one tile. For each block in the received tile data, the flat determination unit 1201 then determines whether the block is a flat block or a non-flat block.

In step S1302, the flat determination unit 1201 determines whether the received tile of interest is a flat tile (first determination processing). That is, the flat determination unit 1201 determines whether all 8×8 blocks (each tile includes 2×2 pixels) of the received tile are flat blocks.

If the tile of interest is determined to be a flat tile, it means that the image data of 16×16 pixels can simply be generated based on the image data of 8×8 pixels of the reduced image. In this case, the flat determination unit 1201 advances the process to step S1303 to output, to the non-flat block analysis unit 1202, a 1-bit flag "1" representing that the tile of interest is a flat tile.

Upon determining in step S1302 that the tile of interest is a non-flat tile, the process advances to step S1304. The flat determination unit 1201 first outputs, to the non-flat block analysis unit 1202, a flag "0" representing that the tile of interest is a non-flat tile. From step S1305, block line encoding processing is performed for each block line in the tile of interest. Note that the encoding processing of each block line to be described below is sequentially executed from the uppermost block line to the lowermost block line of the tile of interest.

In step S1305, the flat determination unit 1201 determines whether the uppermost (first) block line of the tile is a flat block line (second determination processing). That is, the flat determination unit 1201 determines whether all eight blocks arrayed in the horizontal direction are flat blocks.

If the block line of interest is determined to be a flat block line, it means that the image data of a rectangular region including 16 horizontal pixels×2 vertical pixels can simply be restored from eight pixel data arrayed horizontally in the reduced image. In step S1306, the flat determination unit 1201 outputs, to the non-flat block analysis unit 1202, a flag "1" representing that the block line of interest is a flat block line.

Upon determining in step S1305 that the block line of interest is a non-flat block line, the process advances to step S1307. In step S1307, the flat determination unit 1201 outputs, to the non-flat block analysis unit 1202, a flag "0" representing that the block line of interest is a non-flat block line. Then, the process advances to step S1308.

Advancing the process to step S1308 indicates that the block line of interest includes at least one non-flat block. Hence, the flat determination unit 1201 determines in step S1308 whether the sequence of flat and non-flat blocks in the block line of interest coincides with that in a block line determined to be a non-flat block line before the block line of interest (third determination processing). Note that no preceding block line exists if the block line of interest is the first block line of the tile of interest. To indicate this, information representing that all blocks of a block line are non-flat blocks is prepared in advance before determining the block lines of the tile of interest. More specifically, defining a flat block as "1" and a non-flat block as "0", eight bits (8-bit data) "0" are prepared as an initial value. The 8-bit data will be referred to as "reference non-flat block line information" hereinafter. The "reference non-flat block line information" is prepared in a decoding apparatus as well for restoration of one tile.

Assume that the block line of interest is the first block line determined to be a non-flat block line. In this case, the flat determination unit 1201 determines in step S1308 whether the sequence of the determination result of the eight flat and non-flat blocks in the block line of interest coincides with the reference non-flat block line information.

Upon determining that they coincide, the flat determination unit 1201 outputs, to the non-flat block analysis unit 1202 in step S1309, a 1-bit flag "1" representing that the determination result of the blocks in the block line of interest coincides with the reference non-flat block line information.

This will be described with reference to FIG. 10B. In the example of FIG. 10B, the block line of interest determined first to be non-flat corresponds to the fifth block line. This is because eight pieces of additional information included in the fifth block line are "01" which represents a non-flat block. All the eight blocks included in the fifth block line are non-flat blocks and therefore coincide with the reference non-flat block line information (initial 8-bit data "00000000"). For this reason, the flat determination unit 1201 outputs the 1-bit flag "1" to the non-flat block analysis unit 1202 in step S1309.

On the other hand, if it is determined in step S1308 that the data do not coincide, the process advances to step S1310.

The transit to step S1310 occurs when the determination result of the block line of interest does not coincide with the reference non-flat block line information. The flat determination unit 1201 outputs, to the non-flat block analysis unit 1202, a 1-bit flag "0" representing the non-coincidence first, and subsequently, information representing the determination result of each of the eight (8-bit) flat and non-flat blocks of the block line of interest. In step S1311, the flat determination unit 1201 updates the reference non-flat block line information to the determination result (8-bit data) of the flat and non-flat blocks of the block line of interest.

After the process in step S1306, S1309, or S1311 has ended, the process advances to step S1312. In step S1312, the flat determination unit 1201 determines whether the block line of interest is the final block line of the tile of interest. If NO in step S1312, the process advances to step S1313 to move the determination target to the next block line and repeat the process from step S1305. If it is determined in step S1312 that the block line of interest is the final block line of the tile of interest, the flat determination unit 1201 ends the flat determination processing of one tile.

<Description of Non-Flat Block Analysis Unit>

The non-flat block analysis unit 1202 sets "reference non-flat block line information" representing that all eight blocks of one block line are non-flat blocks at the start of processing corresponding to one tile, like the flat determination unit 1201. The non-flat block analysis unit 1202 directly passes the determination result from the flat determination unit 1201 and outputs it to a storage unit 204. At this time, upon determining that there is a block line for which the flag "0" has been output in step S1310 of FIG. 13 described above, the non-flat block analysis unit 1202 updates the reference non-flat block line information to the determination result that follows the flag to represent the flat and non-flat blocks. If the block line of interest has undergone the process in step S1309 of FIG. 13, which block is a non-flat block can be determined by referring to the reference non-flat block line. If it is determined that the block line of interest has undergone the process in step S1310 of FIG. 13, whether a block is a non-flat block can be determined by checking the 8-bit values following the flag "0" at the top. That is, the non-flat block analysis unit 1202 can determine the number and positions of all non-flat blocks in the tile of interest.

Figure 15:
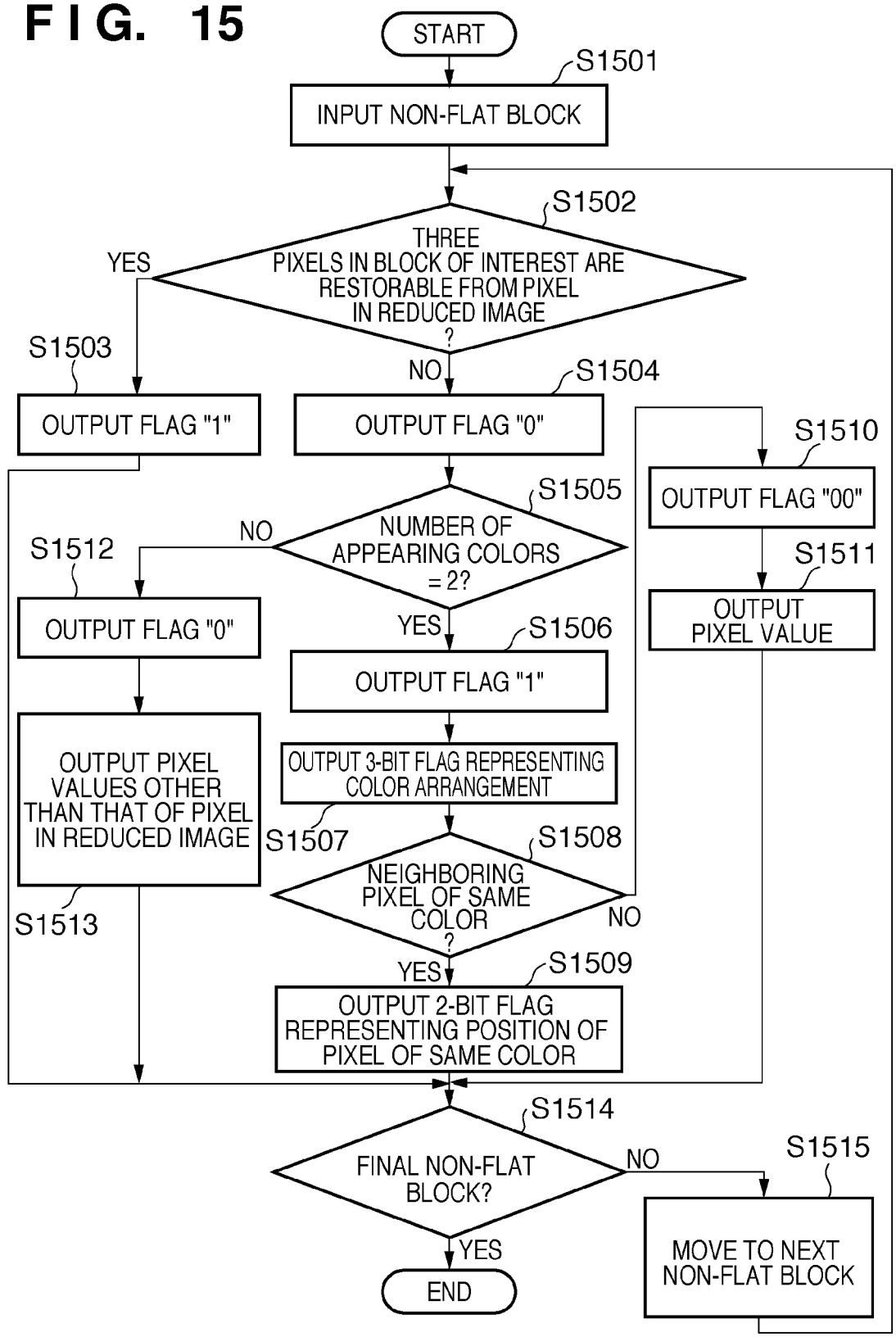
FIG. 15 is a flowchart illustrating the processing procedure of a non-flat block analysis unit according to the third embodiment.

The non-flat block analysis unit 1202 executes non-flat block encoding processing according to the flowchart in FIG. 15 for each block determined to be a non-flat block. The processing of the non-flat block analysis unit 1202 will be described below with reference to FIG. 15.

First, in step S1501, the non-flat block analysis unit 1202 receives 2×2 pixel data representing one non-flat block. In step S1502, the non-flat block analysis unit 1202 determines whether the block of interest satisfies Expression (2) of the first embodiment (fourth determination processing).

If it is determined that Expression (2) is satisfied, setting a pixel P(x,y) in the reduced image as the pixel X at the upper left corner of the block of interest (FIG. 4), the decoding apparatus (image developing unit 205 in this embodiment) can restore the remaining three pixels Xa, Xb, and Xc of the block of interest by $$Xa = P(x+1, y)$$

$$Xb = P(x, y+1)$$

$$Xc = P(x+1, y+1)$$

Hence, the non-flat block analysis unit 1202 outputs a 1-bit flag "1" to the storage unit 204 in step S1503.

Upon determining that the block of interest does not satisfy Expression (2), the non-flat block analysis unit 1202 outputs, in step S1504, a 1-bit flag "0" representing that the condition is not satisfied to the storage unit 204.

The non-flat block analysis unit 1202 advances the process to step S1505 to determine whether the number of colors included in the block of interest is "2" or more (three or four) (fifth determination processing). Note that the number of colors is never "1" because the block of interest is a non-flat block.

If it is determined that the number of colors included in the block of interest is larger than "2" (i.e., three or four), the process advances to step S1512. For that block of interest, the non-flat block analysis unit 1202 outputs a 1-bit flag "0" to the storage unit 204. In step S1513, the non-flat block analysis unit 1202 outputs, to the storage unit 204, the three unused pixel data (8×3=24 bits) in the block of interest (first output processing).

Figure 16:
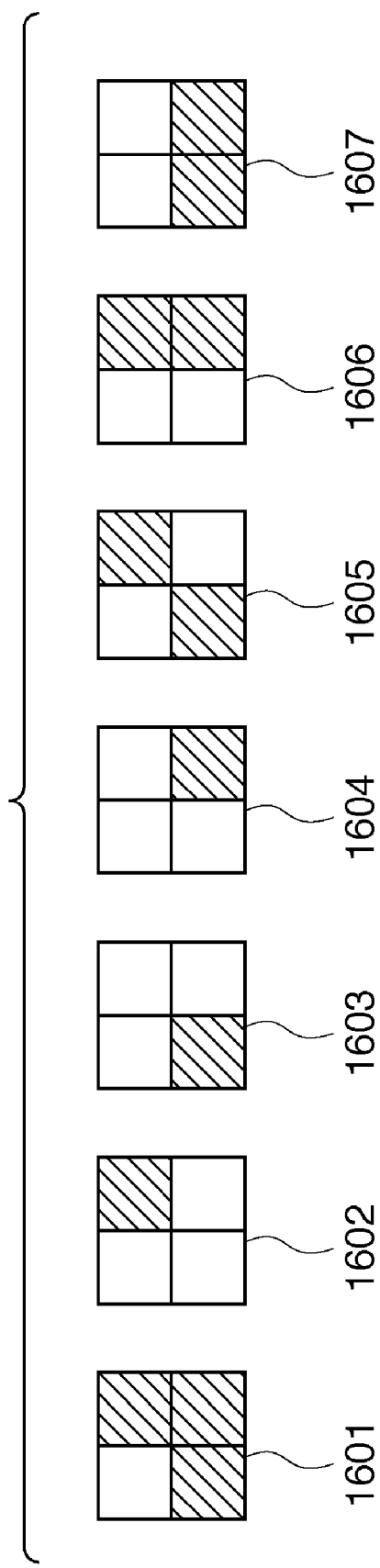
FIG. 16 is a view showing the types of two-color arrangement patterns according to the third embodiment.

On the other hand, upon determining that the number of colors included in the block of interest is "2", the non-flat block analysis unit 1202 outputs, to the storage unit 204, a 1-bit flag "1" representing that the number of appearing colors is "2" in step S1506. Then in step S1507, the non-flat block analysis unit 1202 outputs, to the storage unit 204, pixel arrangement information representing which one of patterns 1601 to 1607 shown in FIG. 16 corresponds to the three pixels Xa, Xb, and Xc of the block of interest in FIG. 4 except for the pixel X used in the reduced image (second output processing). As shown in FIG. 16, the total number of patterns is seven. Hence, 3-bit pixel arrangement information can specify one pattern. In the embodiment, however, a pixel of the same color as that of the pixel used in the reduced image is represented by "1", and a pixel of a different color is represented by "0". Bits corresponding to the pixels Xa, Xb, and Xc in FIG. 4 are output in this order (3 bits in this case as well). For example, the pixels Xa, Xb, and Xc which coincide with the pattern 1601 in FIG. 16 have colors identical to each other but different from the color of the pixel used in the reduced image. Hence, the three bits of pixel arrangement information are "000". The three bits are "100" for the pattern 1602, "010" for the pattern 1603, and "001" for the pattern 1604. A description of the rest will be omitted.

Next, in step S1508, the non-flat block analysis unit 1202 determines whether there is a neighboring pixel having the same color as that of one of the pixels Xa, Xb, and Xc of the block of interest other than the pixel X used in the reduced image, which has a color different from that of the pixel X (sixth determination processing). In this embodiment, the neighboring pixels to be compared are three pixels to refer to the second additional information in the first embodiment. More specifically, the block of interest is expressed as $B_n$, a block adjacent on the right side as $B_{n+1}$, a block immediately below the block of interest as $B_{n+W}$, and a block off to the lower right side of the block of interest as $B_{n+W+1}$. Assume that the block of interest has the pattern 1601 in FIG. 16. In this case, the pixel Xa (also interchangeable with Xb or Xc) is sequentially compared with pixels $B_n(0,0)$, $B_{n+1}(0,0)$, and $B_{n+W}(0,0)$, thereby determining whether a coincident pixel exists. Note that all the pixels $B_n(0,0)$, $B_{n+1}(0,0)$, and $B_{n+W}(0,0)$ are directly used in the reduced image. If the block of interest has the pattern 1603, a pixel in the block of interest, which has a color different from that of the pixel used in the reduced image, is the pixel Xb, as can be seen from FIG. 4. Hence, the pixel Xb is sequentially compared with the pixels $B_n(0,0)$, $B_{n+1}(0,0)$, and $B_{n+W}(0,0)$.

Upon determining that a coincident neighboring pixel exists, the non-flat block analysis unit 1202 advances the process to step S1509 to output, to the storage unit 204, information representing the relative position of the coincident pixel (third output processing). In this embodiment, the number of neighboring pixels to be compared is "3". Hence, two bits suffice to specify the relative position of a coincident pixel. In the embodiment, the non-flat block analysis unit 1202 outputs, to the storage unit 204, two bits "11" if the neighboring pixel $B_n(0,0)$ is coincident, two bits "01" for $B_{n+1}(0,0)$, and two bits "10" for $B_{n+W}(0,0)$.

On the other hand, upon determining in step S1508 that there is no neighboring pixel having the same color as that of one of the pixels Xa, Xb, and Xc of the block of interest other than the pixel X used in the reduced image, which has a color different from that of the pixel X, the non-flat block analysis unit 1202 advances the process to step S1510. In step S1510, the non-flat block analysis unit 1202 outputs two bits "00" to the storage unit 204. Note that the two bits "00" are not used in step S1509.

Next, in step S1511, the non-flat block analysis unit 1202 outputs the value (eight bits) of one of the pixels Xa, Xb, and Xc of the block of interest other than the pixel X used in the reduced image, which has a color different from that of the pixel X (fourth output processing). It would be understood that the decoding apparatus can restore the value of each pixel of the patterns 1601 to 1607 in FIG. 16 by specifying one of the patterns shown in FIG. 16 and knowing the value of one of the pixels Xa, Xb, and Xc of the block of interest other than the pixel X used in the reduced image, which has a color different from that of the pixel X.

After that, the non-flat block analysis unit 1202 advances the process to step S1514 to determine whether the block of interest is the final non-flat block of the tile of interest. If NO in step S1514, the process advances to step S1515. The non-flat block analysis unit 1202 receives 2×2 pixel data representing the next non-flat block and returns the process to step S1502.

Upon determining in step S1514 that the block of interest is the final non-flat block of the tile of interest, the non-flat block analysis unit 1202 ends the processing of the non-flat blocks in the tile of interest.

As described above, according to the third embodiment, the interpolation data generator 1101 first determines whether a tile is a flat tile. If YES, the interpolation data generator 1101 generates 1-bit additional information for the tile and ends the processing. Upon determining that the tile is no flat tile, the interpolation data generator 1101 outputs 1-bit information representing a non-flat tile and verifies a block line narrower than a tile. This processing is repeated up to the final size (block). As a result, the amount of additional information to generate the original resolution image from the reduced image is expected to be smaller than in the first and second embodiments.

Note that an example of processing in three steps of "tile", "block line", and "block" has been described in the above embodiment. However, the number of steps may be increased.

In addition, it is obvious that a computer program can implement processing corresponding to the third embodiment, as in the above-described modification of the first embodiment.

[Fourth Embodiment]

The first to third embodiments have disclosed techniques of completely restoring an original image based on a reduced image and interpolation data (encoded data). That is, the first to third embodiments have disclosed lossless encoding. In the fourth embodiment, a method of generating lossy interpolation data will be explained.

Note that in the fourth embodiment as well, process target image data is assumed to be monochrome multi-valued image data for the descriptive convenience. This embodiment is also applicable to RGB image data or CMYK color image data. A color space of any type is usable.

The fourth embodiment is the same as the third embodiment except the process contents of a non-flat block analysis unit 1202. Hence, the apparatus arrangement is the same as in FIGS. 11 and 12, and a description thereof will not be repeated.

Figure 17A:
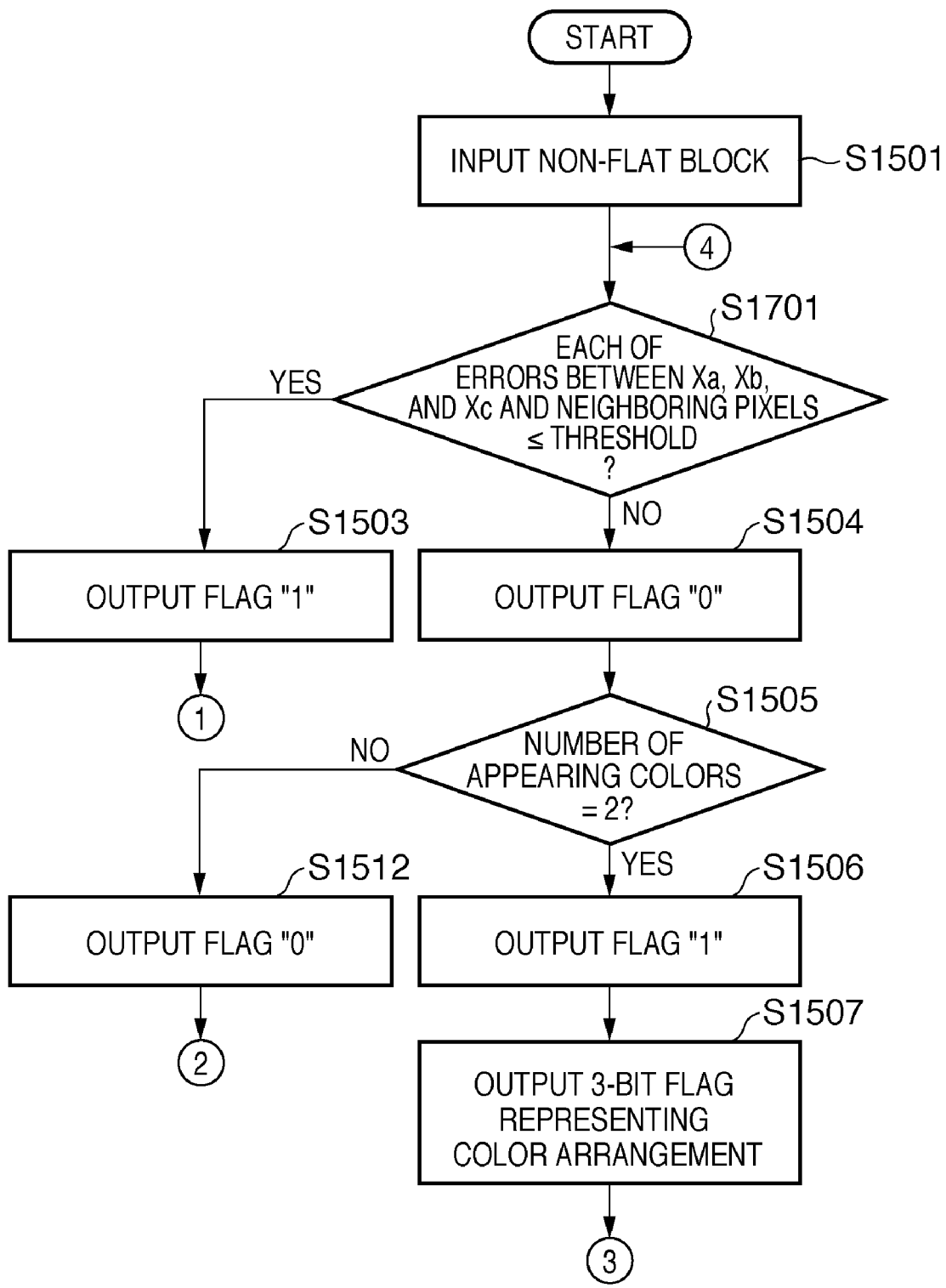
FIGS. 17A and 17B are flowcharts illustrating the processing procedure of a non-flat block analysis unit according to the fourth embodiment.
Figure 17B:
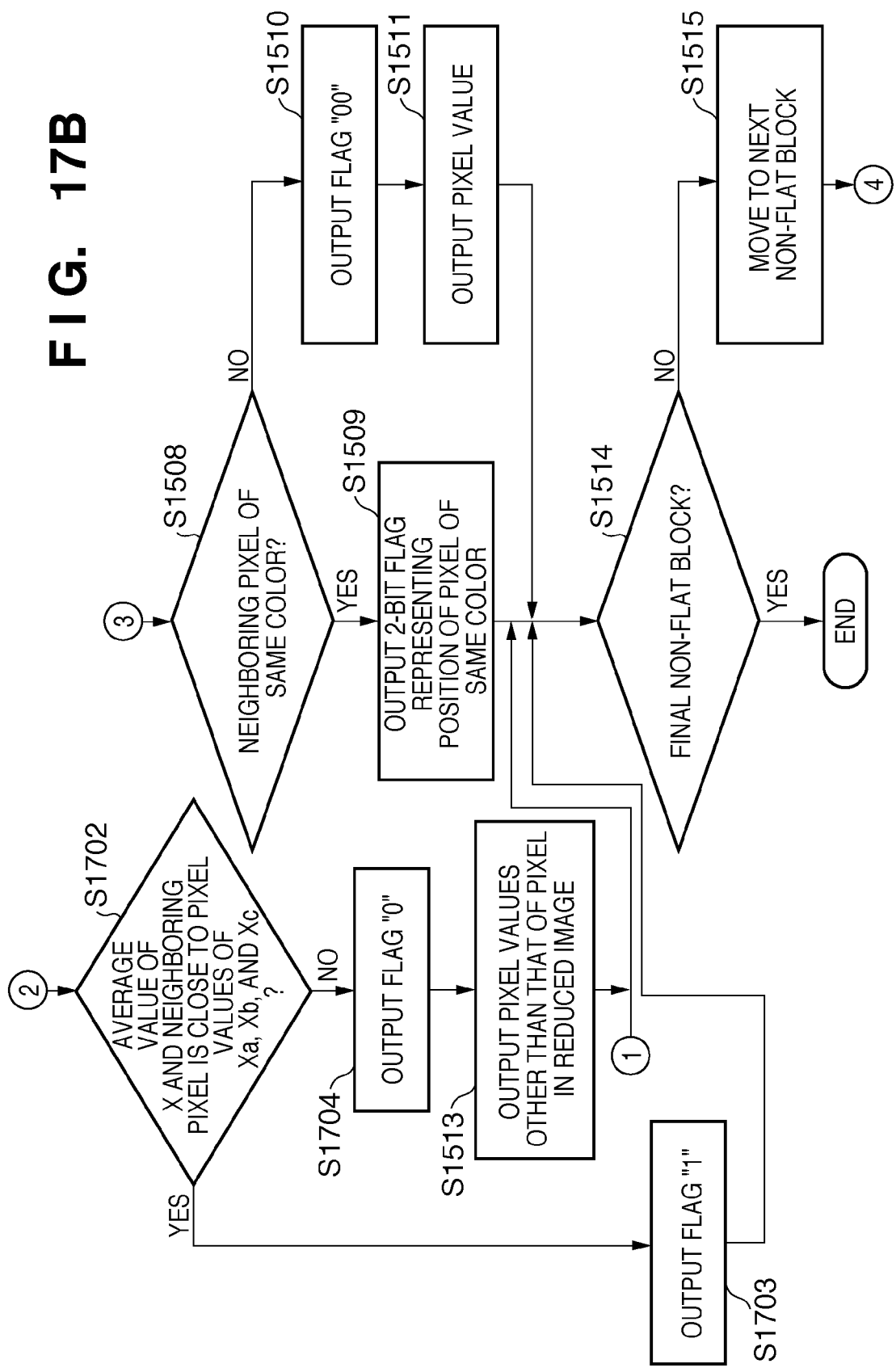

FIGS. 17A and 17B are flowcharts illustrating the processing procedure of the non-flat block analysis unit 1202 according to the fourth embodiment. It should be understood that the flowchart in FIGS. 17A and 17B replaces that in FIG. 15. Hence, the same step numbers denote the same process contents.

First, in step S1501, the non-flat block analysis unit 1202 receives the image data of 2×2 pixels representing a non-flat block. In step S1701, the non-flat block analysis unit 1202 determines whether, in a received block $B_n$ of interest, three pixels Xa, Xb, and Xc in FIG. 4 have colors similar to those of neighboring pixels to be referred to (seventh determination processing). That is, complete matching is not required, unlike the first to third embodiment.

More specifically, let Th1 be a threshold representing an allowable color difference (the user can change Th1 via, e.g., the operation unit or keyboard as needed). The non-flat block analysis unit 1202 determines that the three pixels Xa, Xb, and Xc have colors similar to those of the neighboring pixels to be referred to when they satisfy $|B_n(0,1)-B_{n+1}(0,0)| \leq Th1$, and $|B_n(1,0)-B_{n+W}(0,0)| \leq Th1$, and $|B_n(1,1)-B_{n+W+1}(0,0)| \leq Th1$ where |z| is the absolute value of z.

Note that the present inventors have found that the threshold Th1 is a single-digit numerical value, and preferably, Th1=4.

If the inequalities are satisfied, the non-flat block analysis unit 1202 advances the process to step S1503 to output a flag "1" and end processing of the block $B_n$ of interest. Then, processing of the next non-flat block starts. At this time, depending on the set threshold, it is possible to maintain image quality whose degradation is hard to notice while suppressing the interpolation data amount.

In the third embodiment, if the number of colors that appear in the block $B_n$ of interest is three or four, the pixel values of three pixels need to be output. In the fourth embodiment, step S1702 representing determination processing is added before pixel value output (step S1513). In step S1702, the non-flat block analysis unit 1202 determines whether the three pixels Xa, Xb, and Xc in FIG. 4 have values (equal to or smaller than a threshold Th2) close to the average values of adjacent pixels.

More specifically, the non-flat block analysis unit 1202 calculates average values Xave1 to Xave3 of four pixels used in the reduced image by $X\text{ave}1 = \{B_n(0,0)+B_{n+1}(0,0)\}/2$ $X\text{ave}2 = \{B_n(0,0)+B_{n+W}(0,0)\}/2$ $X\text{ave}3 = \{B_n(0,0)+B_{n+W+1}(0,0)\}/2$ (fractions below the decimal point are dropped).

When $|B_n(0,1)-X\text{ave}1| \leq Th2$, and $|B_n(1,0)-X\text{ave}2| \leq Th2$, and $|B_n(1,1)-X\text{ave}3| \leq Th2$ are satisfied, the non-flat block analysis unit 1202 determines that the three pixels Xa, Xb, and Xc have values (equal to or smaller than the threshold) close to the average values of adjacent pixels.

The threshold Th2 is also set by the user as needed. The threshold Th2 is preferably a single-digit positive integer at maximum (threshold Th2=4 in this case as well).

Upon determining that all the pixels Xa, Xb, and Xc have small differences to the average values (YES), the non-flat block analysis unit 1202 advances to the process to step S1703 to output a flag "1" (fifth output processing). On the other hand, if all the pixels Xa, Xb, and Xc have large differences to the average values (NO), the non-flat block analysis unit 1202 advances to the process to step S1704 to output a flag "0". then, in step S1513, the non-flat block analysis unit 1202 outputs the pixel values, as in the third embodiment.

The above-described processing makes is possible to generate lossy interpolation data without rarely changing the processing of lossless interpolation data while controlling the errors to the pixel values of the original image data. It would easily be understood that since the pixel values have tolerances to some extent, the interpolation data amount can further be decreased as compared to the third embodiment.

Note that in the above-described fourth embodiment, lossy interpolation data generation is done using two determination processes in steps S1701 and S1702. However, only one of the processes may be applied.

[Fifth Embodiment]

In the fifth embodiment, a method of controlling the code amount by switching between lossless interpolation data generation and lossy interpolation data generation will be described.

When the code amount of interpolation data needs to fall within a predetermined data amount range, the code amount can be controlled stepwise in consideration of the relationship between the code amount and the image quality.

If it is unnecessary to control the code amount because priority is given to the image quality, lossless interpolation data is generated. In this case, there is no guarantee that the data amount is always small because three restoration target pixel values are directly output in some blocks.

To suppress the code amount while holding the image quality, a lossy interpolation data generation method as described in the fourth embodiment is applied, which can suppress the code amount while suppressing the maximum errors of pixel values between the original image and the restored image.

To further suppress the code amount of interpolation data, the tone or resolution of pixels whose pixel values are directly output as interpolation data is decreased. For example, when a block of 2×2 pixels includes three or four colors, the number of colors is decreased to two, or the tone is decreased from eight bits to four bits. When the pixel values are output, the code amount corresponds to 3 pixels×8 bits. Decreasing the number of colors to two reduces the code amount to 1 pixel×8 bits. Decreasing the tone from eight bits to four bits reduces the code amount to 3 pixels×4 bits. This method allows to decrease the code amount of interpolation data to almost ½ the original image at maximum, although a new flag is added.

As another control method, if a block of 2×2 pixels includes three or four colors, the pixels whose pixel values should be output are prohibited from outputting them, thereby controlling the code amount of interpolation data. In this case, when developing the image, one pixel of the reduced image is simply enlarged. Alternatively, when a block is determined to have three or four colors, the average value of the 2×2 pixels is calculated. The pixels of the reduced image are replaced with the average value. In developing the image, one pixel of the reduced image replaced with the average value is simply enlarged, thereby restoring the image. In this case, the 2×2 pixels have one color, the resolution of the image only partially lowers. A region where a block of 2×2 pixels includes three or four colors is estimated to be a region of a high resolution natural image at high possibility. In such a region, degradation in the image quality is supposed to be rarely noticeable even at a lower resolution.

In the above description, the method is switched depending on which has priority in generating interpolation data, the image quality or the code amount. However, the code amount can also be controlled by generating lossless interpolation data and discarding part of the data. For example, when generating lossless interpolation data for a block including three or four colors, the pixel values of pixels Xa, Xb, and Xc are output. The code amount can be controlled by discarding the pixel value of the three pixels halfway through or after the interpolation data generation. In this case, the block whose pixel values have been discarded is simply enlarged using a pixel of the reduced image when developing the image. Generating, simultaneously with the lossless interpolation data generation, data necessary after information discarding makes it possible to switch to another information with a small code amount without redoing the interpolation data generation. For example, when generating lossless interpolation data for a block including three or four colors, the pixel values of the pixels Xa, Xb, and Xc are output. At this time, the average value of the 2×2 pixels is held simultaneously. If code amount control is necessary halfway through or after the interpolation data generation, the pixel values of the pixels Xa, Xb, and Xc are discarded from the interpolation data and replaced with the calculated average value. The above-described methods enable to easily control the code amount by discarding part of the interpolation data or replacing pixel values with information having a small data amount halfway through or after the interpolation data generation.

[Sixth Embodiment]

In the first to fifth embodiments, when generating a reduced image from an original image, the pixel $B_n(0,0)$ located at the upper left position of 2×2 pixels is used as a pixel of the reduced image, and interpolation data of the remaining three pixels $B_n(1,0)$, $B_n(0,1)$, and $B_n(1,1)$ is generated. However, the pixel to be used for the reduced image need not always be the upper left pixel of the block of 2×2 pixels and can be any one of the pixels $B_n(1,0)$, $B_n(0,1)$, and $B_n(1,1)$. In the sixth embodiment, a case will be explained in which the pixel $B_n(1,1)$ located at the lower right corner of a block $B_n$ of 2×2 pixels is used as a pixel of the reduced image.

Figure 18:
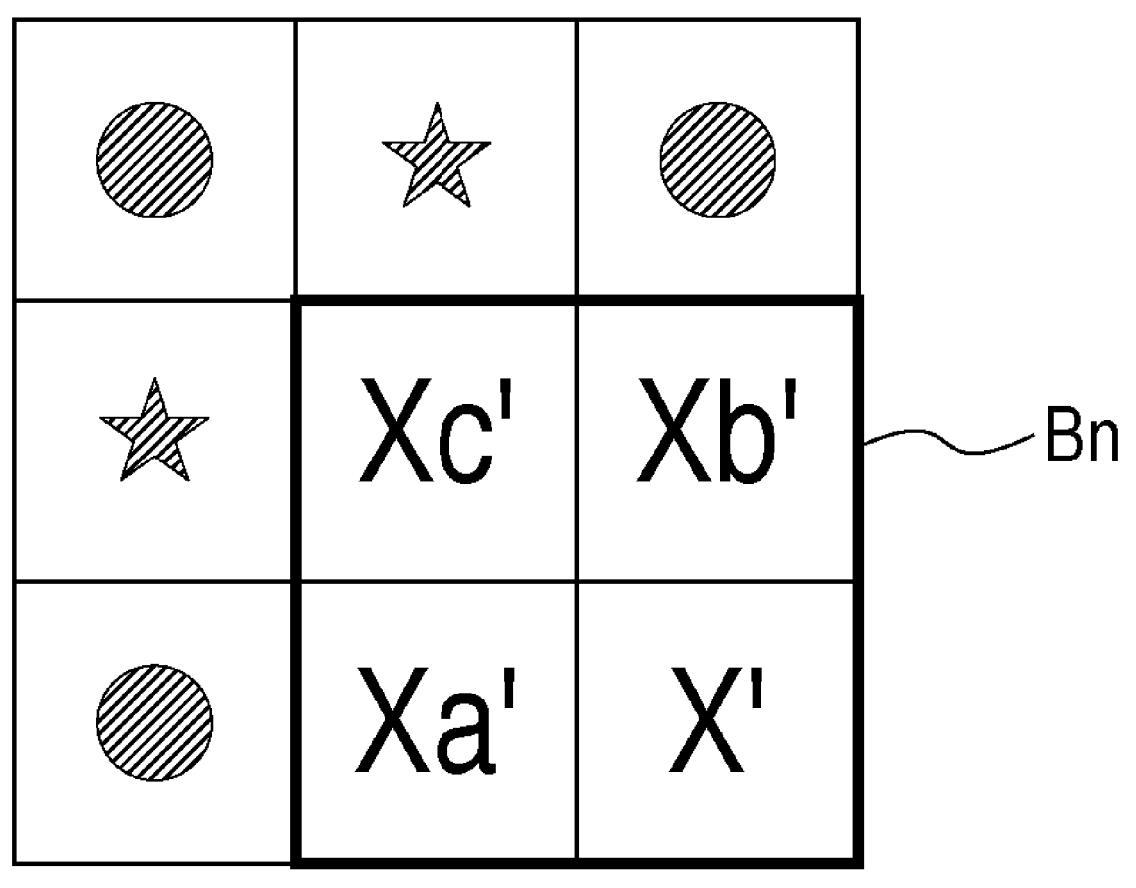

In the sixth embodiment, a pixel X' in the block $B_n$ of interest of 2×2 pixels shown in FIG. 18 is used as a pixel of the reduced image, and remaining three pixels Xa', Xb', and Xc' are restoration targets.

Basically, the reference positions when sub-sampling the lower right pixel are and those when sub-sampling the upper left pixel are symmetric with respect to a point.

For example, in the above-described embodiments, the pixel $B_{n+1}(0,0)$ is referred to for the pixel $B_n(0,1)$ in the block of interest, $B_{n+W}(0,0)$ for $B_n(1,0)$, and $B_{n+W+1}(0,0)$ for $B_n(1,1)$. In the sixth embodiment, however, pixels indicated by full circles shown in FIG. 18 are referred to. More specifically, a pixel $B_{n-1}(1,1)$ is referred to for the pixel $B_n(1,0)$, $B_{n-W}(1,1)$ for $B_n(0,1)$, and $B_{n-W-1}(1,1)$ for $B_n(0,0)$. This enables interpolation data generation in accordance with the same procedures as in the first to fifth embodiments.

Hence, step S1701 of the fifth embodiment is expressed in the following way.

The sampling target pixel in the block of interest is defined as X, and three non-sampling target pixels are defined as Xa, Xb, and Xc. A sampling target pixel which is included in a block adjacent to the block of interest and located adjacent to the pixel Xa is defined as X1. Similarly, a sampling target pixel which is included in another block adjacent to the block of interest and located adjacent to the pixel Xb is defined as X2. A sampling target pixel which is included in still another block adjacent to the block of interest and located adjacent to the pixel Xc is defined as X3. A preset positive threshold is defined as Th1. In this case, it is determined in step S1701 whether $|Xa-X1| \leq Th1$, and $|Xb-X2| \leq Th1$, and $|Xc-X3| \leq Th1$ are satisfied. When this condition is satisfied, it is determined that the three non-sampling target pixels in the block of interest can be restored from the sampling target pixels in the three blocks adjacent to the block of interest.

Applying the same definitions as described above, it is determined for a threshold Th2 in step S1702 of FIG. 17B whether $|Xa-(X+X1)/2| \leq Th2$, and $|Xb-(X+X2)/2| \leq Th2$, and $|Xc-(X+X3)/2| \leq Th2$ are satisfied.

When the upper left pixel X is sub-sampled, and the pixels on the right and lower sides of the block of interest are referred to, as in the first to fifth embodiments, it is impossible to refer to pixels at positions where decoding processing has not been executed yet in developing the image. Only the pixels of the reduced image can be referred to. It is therefore necessary to prefetch the pixels $B_{n+1}(0,0)$, $B_{n+W}(0,0)$, and $B_{n+W+1}(0,0)$ corresponding to the pixels of the reduced image. According to the sixth embodiment, however, when the lower right pixel X' is sub-sampled, and the pixels on the upper and left sides of the block $B_n$ of interest are referred to, pixels other than the pixels $B_{n-1}(1,1)$, $B_{n-W}(1,1)$, and $B_{n-W-1}(1,1)$ (pixels indicated by the full circles in FIG. 18) corresponding to the pixels of the reduced image can also be referred to because the image has already been developed in the reference blocks. For example, to generate second additional information or determine whether there is a neighboring pixel of a color that is the same as the second color of a block including two colors, the reference pixels need not always be those indicated by the full circles in FIG. 18. Only the pixels indicated by the full circles may be referred to, as a matter of course. Alternatively, pixels indicated by stars may be used as the reference pixels. Both the pixels indicated by the full circles and those indicated by the starts may be used as the reference pixels.

Changing or expanding the reference range for coincidence/non-coincidence determination can improve the encoding efficiency in interpolation data generation.

[Seventh Embodiment]

In the seventh embodiment, a code amount control method will be described which decides a parameter in lossy interpolation data generation by using statistical information acquired upon lossless interpolation data generation, thereby efficiently suppressing the interpolation data amount to a target code amount.

Figure 19:
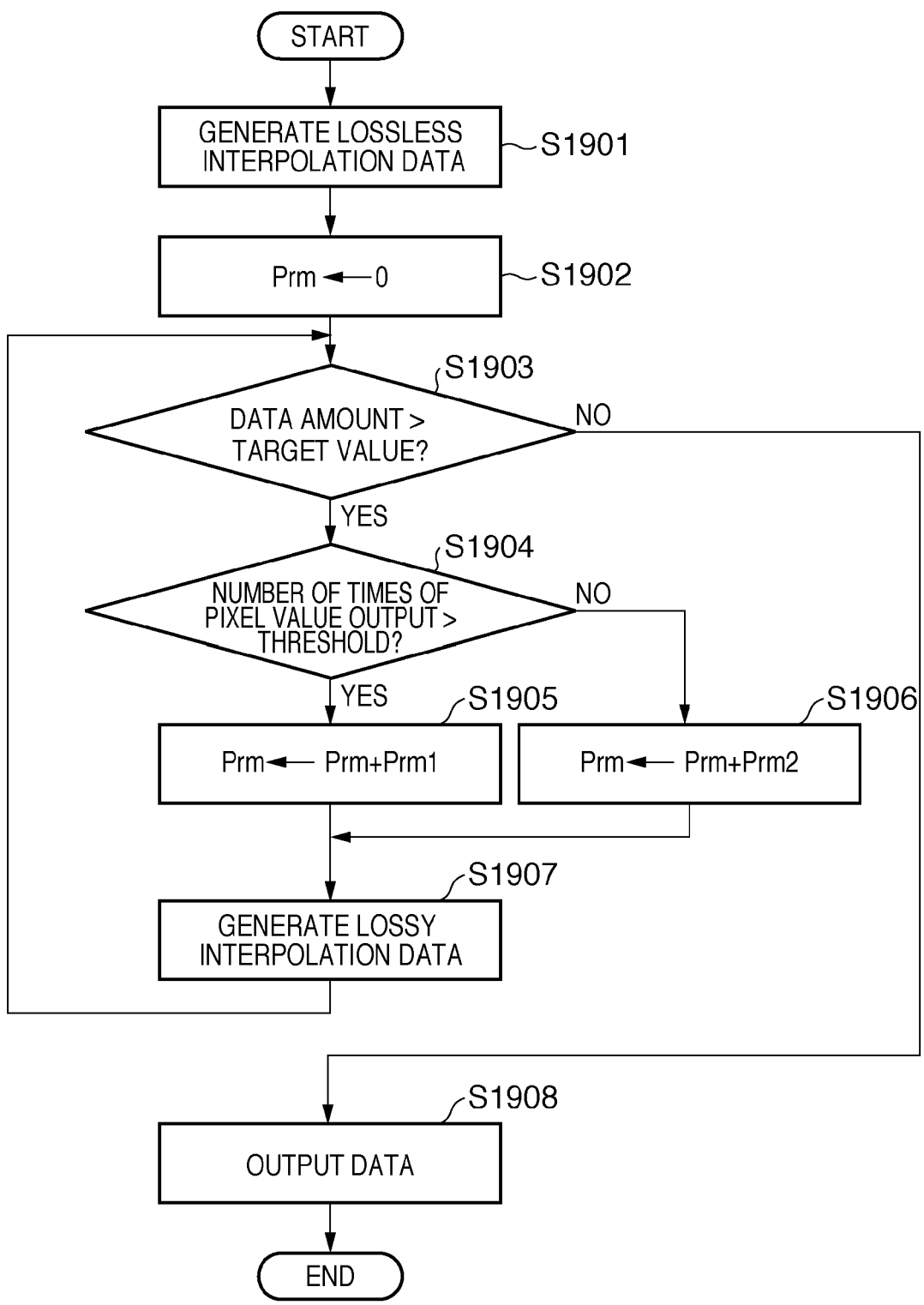
FIG. 19 is a flowchart illustrating the processing procedure of an interpolation data code amount control method according to the seventh embodiment.

FIG. 19 is a flowchart illustrating a processing procedure according to the seventh embodiment.

Lossless interpolation data generation in step S1901 is the same as described above, and a description thereof will not be repeated in this embodiment. Statistical information to be acquired when generating lossless interpolation data will be explained below.

In lossless interpolation data generation, when interpolation target pixels cannot be reproduced from pixels of the reduced image or neighboring pixels around the block of interest, the interpolation target pixel values are output as encoded data (steps S1513 and S1511 of non-flat block processing shown in FIG. 15). If the pixel values are output, the data amount may be larger than that of the original image because of flag information other than the pixel values, as described above. For this reason, in lossy interpolation data generation, decreasing or deleting blocks whose pixel values are to be output is supposed to enhance the data amount reduction effect.

To do this, the number of blocks to be subjected to the pixel value output processing is counted in generating lossless interpolation data. The counted number of blocks of the pixel value output processing is held as statistical information.

After the end of lossless interpolation data generation and statistical information recording, a parameter Prm for lossy encoding is cleared to zero in step S1902, and the process advances to step S1903.

In step S1903 (first comparison processing), the data amount of the interpolation information generated by lossless interpolation data generation is compared with a preset target data amount. If the comparison result indicates that the interpolation data amount is larger than the target value, the process advances to step S1904. If the comparison result indicates that the interpolation data amount is equal to or smaller than the target value, the process advances to step S1908 to output the lossless interpolation data.

In step S1904 (second comparison processing), the statistical information acquired upon lossless interpolation data generation, i.e., the number i of times of pixel value output (the number of blocks of pixel value output) is compared with a preset threshold Th3. The threshold Th3 is set at an arbitrary value. In this embodiment, the threshold Th3 is set to 30% of the number of blocks each having 2×2 pixels in the entire input image. For, e.g., an A4 image at 600 dpi, the image size is about 4,960×7,016 pixels, and the total number of blocks each including 2×2 pixels is 8,699,840. The threshold Th3 is 30% the number of blocks, i.e., 2,609,952. The number i of times is compared with the threshold Th3. A parameter to set the degree of tone reduction (to be described later) is decided based on the comparison result. More specifically, if the number i of times of pixel value output is larger than the threshold Th3 (YES), the process advances to step S1905 to update the parameter Prm to be used for lossy interpolation data generation by adding Prm1. On the other hand, if the number i of times of pixel value output is equal to or smaller than the threshold Th3 (NO), the process advances to step S1906 to update the parameter Prm to be used for lossy interpolation data generation by adding Prm2. In this case, Prm1>Prm2.

After updating the parameter Prm in step S1905 or S1906, the process advances to step S1907 to generate lossy interpolation data. Details of the lossy interpolation data generation method of this embodiment will be described below.

Figure 20:
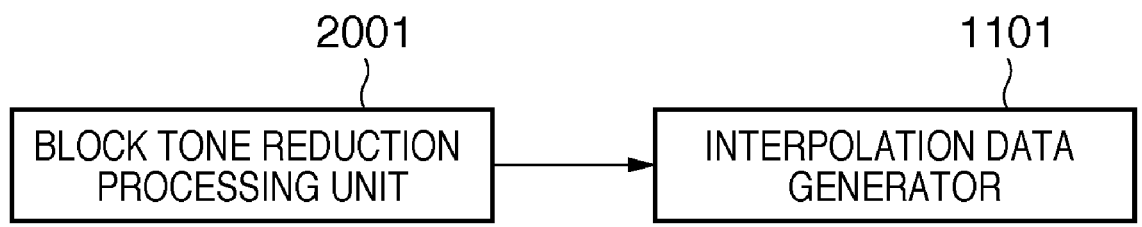
FIG. 20 is a block diagram of lossy interpolation data generation according to the seventh embodiment.

FIG. 20 is a block diagram of an arrangement which performs lossy interpolation data generation processing in step S1907. A block tone reduction processing unit 2001 first checks the pixel values in each block of 2×2 pixels. If the 2×2 pixels include at least one set of pixels having close colors, they are integrated. This processing is performed in the entire image. Then, an interpolation data generator 1101 generates interpolation data. The process contents of the interpolation data generator 1101 are the same as those described in the third embodiment, and a description thereof will not be repeated. The block tone reduction processing unit 2001 performs the processing in, e.g., the following way.

The block tone reduction processing unit 2001 checks the color differences between the 2×2 pixels of the block of interest and calculates $$F1=|X-Xa|$$

$$F2=|X-Xb|$$

$$F3=|X-Xc|$$

$$F4=|Xa-Xb|$$

$$F5=|Xa-Xc|$$

$$F6=|Xb-Xc|$$

The colors of the 2×2 pixels are integrated if $$Prm > \max(F1,F2,F3,F4,F5,F6) \qquad (3)$$

holds, where $\max(A1, A2, \ldots, An)$ is a function that returns the maximum value of $A1, A2, \ldots, An$.

In this embodiment, color integration is correcting (replacing) the interpolation target pixels Xa, Xb, and Xc to (with) the color of the pixel X sampled for reduced image generation. That is, the block of interest is converted into a flat block. Note that since Prm1>Prm2, when Prm1 is selected, the possibility that the colors are integrated is high, and when Prm2 is selected, the possibility that the colors are integrated is low.

If Expression (3) does not hold, the colors of all pixels (four pixels) in the block of interest are not close to each other. Hence, integration processing is not performed. However, if two pixels in the block have not completely identical but similar colors, the pixel values may be replaced with the average value of the two colors. This is because the number of colors included in the block of interest can decrease but not increase. If the number of colors decreased from "4" to "3", the compression ratio does not rise. However, if the number of colors decreases to "1", the block of interest is a flat block, and the compression ratio is expected to be higher. If the number of colors is "2", the block corresponds to one of the patterns shown in FIG. 16, and the compression ratio is expected to be higher.

Another tone reduction method will be described below.

First, the 2×2 pixels are searched for two pixels having the largest color distance. The two pixels having the large color distance are defined as the representative colors of the respective groups. Next, the color distance between each representative color and each pixel having no representative color is obtained, and the pixel is put into the group with a smaller color distance. The pixels put into each group are integrated, thereby reducing the number of colors of the 2×2 pixels to two. The pixels in each group are integrated by replacing the pixel values with the average value between them. However, in this embodiment, if a group includes the pixel X of the reduced image, all the pixel values in that group are replaced with X.

The above-described tone reduction processing is executed for the blocks each having 2×2 pixels in the entire image. When the tone reduction processing has ended for the blocks of the whole image, the image data that has undergone the tone reduction processing is output to the interpolation data generator and re-encoded.

The process contents of the interpolation data generator 1101 are the same as those of lossless interpolation data generation described in the third embodiment except that the input image data is the original image or the image that has undergone the tone reduction processing.

When interpolation data generation is performed after tone reduction processing by the above-described method, the number of colors in a block decreases. Since two- or three-color processing of a non-flat block can be executed, the possibility that the pixel values of three pixels are output becomes low, and the interpolation data amount can be suppressed. Additionally, adjusting the parameter in the tone reduction processing based on the number i of times of pixel value output acquired in lossless interpolation data generation, makes it possible to decrease the interpolation data amount while maintaining the image quality as high as possible. More specifically, if the number i of times of pixel value output is large in lossless interpolation data generation, the parameter is set large to facilitate color integration and enhance the interpolation data amount suppressing effect. On the other hand, if the number i of times of pixel value output is small, the parameter is set not to be so large to minimize changes in the colors. This allows to suppress the data amount while maintaining high image quality.

Note that in this embodiment, only the number of times of pixel value output is counted and used. However, even if the number of times of pixel value output does not change, the interpolation data amount changes because the pixel value of one pixel is output when a block includes two colors, and the pixel values of three pixels are output when a block includes three or four colors. Hence, the information may be counted separately in pixel value output of two-color processing (one pixel value is output) and in pixel value output of four-color processing (output three pixel values are output), and the parameter setting method may be changed based on the information.

After the lossy interpolation data generation (step S1907), the process returns to step S1903 to compare the lossy interpolation data amount with the predetermined target amount. If the lossy interpolation data amount is smaller than the target value (NO), the process advances to step S1908 to output the interpolation data and end the processing. On the other hand, if the interpolation data amount is larger than the target value (YES), the parameter is reset, and lossy encoding is performed. The reset parameter gradually takes a larger value. In the worst case, all blocks in the image have the same color. However, the number of times of repeat is limited, and if the number of times of repeat has exceeded an arbitrary value, a value larger than the maximum pixel value is set as the parameter. This enables to end the processing.

In the lossy interpolation data generation of the above-described embodiment, after block tone reduction processing is ended for the entire image, interpolation data is generated in accordance with the same procedure as in lossless interpolation data generation for the descriptive convenience. However, the lossy interpolation data generation method is not limited to this. The interpolation data of a block of interest may be generated following tone reduction in the block of interest. At this time, extracting the lower right pixel in the block as a pixel of the reduced image makes it possible to refer to the pixel values after tone reduction processing even when referring to the neighboring pixels. This allows processing of each block.

[Eighth Embodiment]

In the above-described seventh embodiment, if the interpolation data amount has exceeded the target value in lossless interpolation data generation, the parameter to be used for re-encoding in lossy interpolation data generation is decided based on information acquired upon generating lossless interpolation data. In the eighth embodiment, a code amount control method will be explained which changes the data decreasing method itself based on information acquired upon lossless interpolation data generation.

Figure 21:
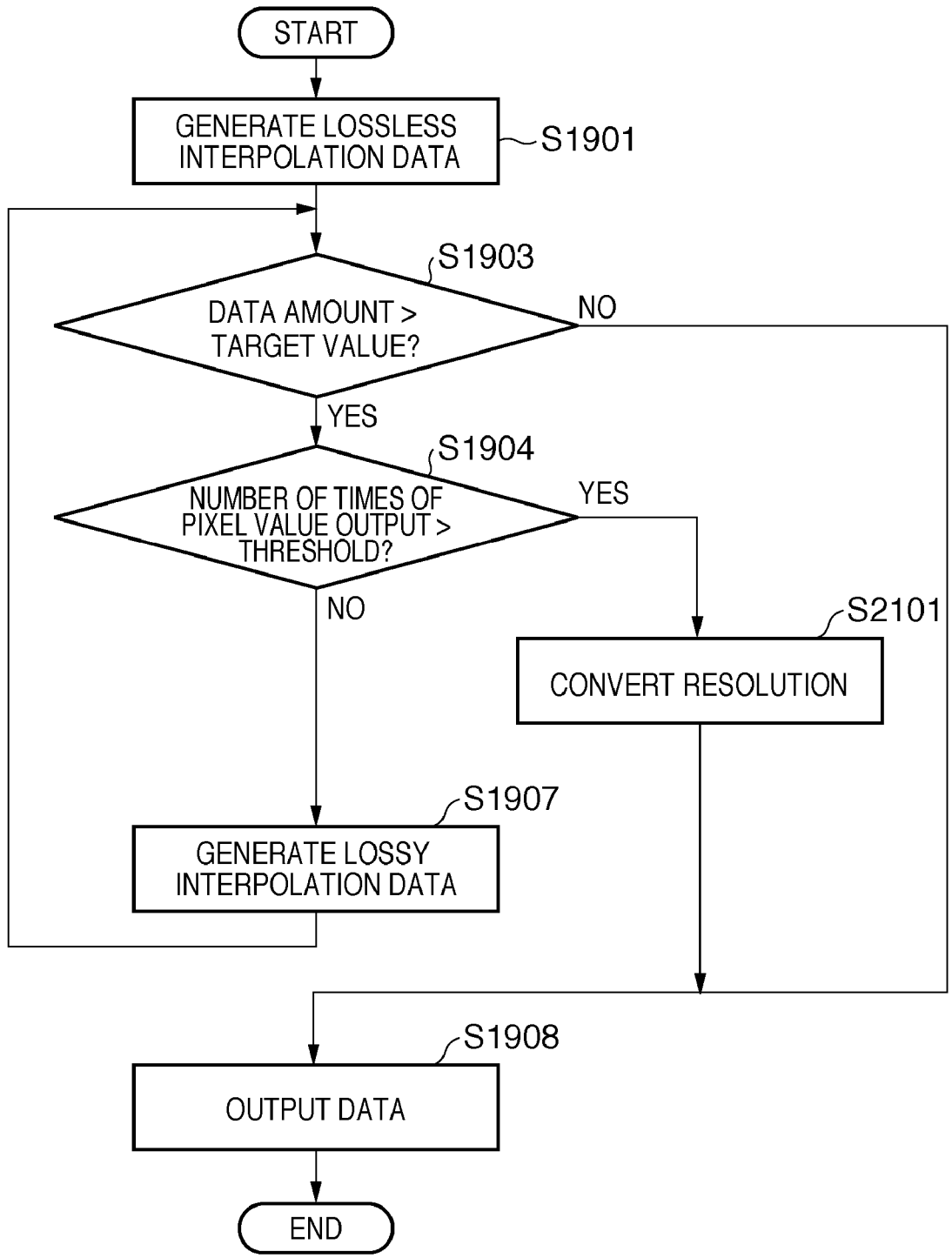
FIG. 21 is a flowchart illustrating the processing procedure of an interpolation data code amount control method according to the eighth embodiment.

FIG. 21 is a flowchart illustrating a processing procedure according to the eighth embodiment. A description of the same process contents as in FIG. 19 will not be repeated.

In the eighth embodiment, it is determined based on the amount of lossless interpolation data whether to perform re-encoding (step S1903), as in the seventh embodiment. Upon determining to perform re-encoding, the same determination as in the seventh embodiment is performed in step S1904. In the eighth embodiment, however, the lossy processing method is switched instead of changing the parameter set value in lossy interpolation data generation. More specifically, if the number i of times of pixel value output is larger than a threshold Th3 (YES), the process advances to step S2101. If the number i of times of pixel value output is equal to or smaller than the threshold Th3 (NO), the process advances to step S1907 to generate lossy interpolation data. When the lossy interpolation data has been generated, the process returns to step S1903 to determine whether the lossy interpolation data amount is equal to or smaller than the target value. If the lossy interpolation data amount is larger than the target value, the process advances to step S1904. In this embodiment, however, when executing the determination in step S1904 for the second time, "0" is set as the threshold Th3 to always advance the process to step S2101.

In step S2101, the whole input image data is resolution-converted. As the resolution conversion method, the values of 2×2 pixels are replaced with the average value of 2×2 pixels in a block of interest. The average value of 2×2 pixels is calculated to make degradation in the image quality as unnoticeable as possible. However, the method is not limited to this. The data amount after resolution conversion is ¼ that of the input image data. When resolution conversion has been performed, the process advances to step S1908 to output the data after the resolution conversion.

The above-described processing allows to decrease the data amount by lossy interpolation data generation or resolution conversion processing when the interpolation data amount is equal to or larger than a predetermined value. Whether to generate lossy interpolation data or perform resolution conversion processing is determined based on information acquired upon lossless interpolation data generation.

If the number of times of pixel value output is very large, direct resolution conversion can be performed. Since the number of times of repeat decreases, the process time shortens. Additionally, an image for which the number of times of pixel value output is very large is, at a high possibility, an image like a high resolution natural image including many changes in the pixel value. Degradation in the image quality is hardly noticeable even at a lower resolution after resolution conversion. This makes it possible to suppress the data amount while maintaining the image quality.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-297098, filed Nov. 20, 2008 and No. 2009-020743, filed Jan. 30, 2009, which are hereby incorporated by reference herein in their entirety.

What is claimed is:

1. An image encoding apparatus for encoding image data, comprising:
   an input unit which inputs a block of 2×2 pixels from original image data of an encoding target;
   a reduced image generator which generates and outputs reduced image data having a size smaller than the original image data by sampling one pixel data at a preset position in the input block; and
   an encoder which generates encoded data to restore three non-sampling target pixel data in each block so as to restore the original image data from the reduced image data generated by said reduced image generator,
   wherein said encoder comprising:
   a determination unit which, letting X be a sampling target pixel in a block of interest, and Xa, Xb, and Xc be non-sampling target pixels in the block of interest, determines
   condition (a): whether all the pixels Xa, Xb, and Xc are restorable from the pixel X in the block of interest, and
   condition (b): whether all the pixels Xa, Xb, and Xc are restorable from sampling target pixels in three blocks adjacent to the block of interest; and
   an additional information generator which generates first additional information as encoded data of the block of interest when said determination unit has determined that the block of interest satisfies the condition (a), generates second additional information different from the first additional information as the encoded data of the block of interest when said determination unit has determined that the block of interest satisfies not the condition (a) but the condition (b), and generates third additional information different from the first additional information and the second additional information as the encoded data of the block of interest when said determination unit has determined that the block of interest satisfies neither the condition (a) nor the condition (b).

2. The apparatus according to claim 1, wherein the first additional information is formed from one bit, the second additional information is formed from two bits of which a first bit has a value different from the first additional information, and the third additional information is formed from two bits, of which a first bit is identical to the first bit of the second additional information and a second bit is different, and three pixel data corresponding to the pixels Xa, Xb, and Xc.

3. The apparatus according to claim 1, further comprising:
   an encoded data input unit which inputs encoded data of M horizontal blocks×N vertical blocks (each of M and N is an integer not less than 2) generated by said additional information generator; and
   a tile integration unit which integrates the encoded data of the M×N blocks input by said encoded data input unit into encoded data of one tile including the M×N blocks,
   said tile integration unit comprising:
   a first integration unit which outputs flag information representing integration to a tile and outputs the encoded data following the flag information when all the encoded data of the M×N blocks include encoded data of only one type of the first additional information, the second additional information, and the third additional information; and
   a block line integration unit which outputs flag information representing non-integration to a tile and integrates encoded data of each block line which is formed from encoded data of M blocks arrayed horizontally in a tile of interest when all the encoded data of the M×N blocks include encoded data of at least two types, and
   said block line integration unit comprising:
   a second integration unit which outputs flag information representing integration to a block line and outputs the encoded data following the flag information when M encoded data of a block line of interest include encoded data of only one type of the first additional information, the second additional information, and the third additional information; and
   a unit which outputs flag information representing non-integration to a block line and outputs the encoded data of the M blocks included in the block line of interest when the M encoded data of the block line of interest include encoded data of at least two types.

4. The apparatus according to claim 1, wherein said encoder determines
   that the condition (a) is satisfied when X=Xa=Xb=Xc holds, and
   that the condition (b) is satisfied when, letting X1 be a sampling target pixel included in an adjacent block and located adjacent to the pixel Xa so as to be referred to restore the pixel Xa, X2 be a sampling target pixel included in another adjacent block and located adjacent to the pixel Xb so as to be referred to restore the pixel Xb, and X3 be a sampling target pixel included in still another adjacent block and located adjacent to the pixel Xc so as to be referred to restore the pixel Xc, Xa=X1, and Xb=X2, and Xc=X3 hold.

5. The apparatus according to claim 1, further comprising:
a first comparison unit which compares a data amount of the encoded data obtained by said additional information generator with a preset target code amount; and
a tone reduction unit which reduces the number of colors represented by each block of the original image data input by said input unit by adjusting values of pixels in each block if a comparison result of said first comparison unit indicates that the data amount of the encoded data exceeds the target code amount,
wherein said encoder executes re-encoding of the block which has undergone tone reduction of said tone reduction unit.

6. The apparatus according to claim 5, further comprising:
a second comparison unit which compares the number of third additional information generated by said additional information generator with a threshold decided by the total number of blocks included in the original image data; and
a setting unit which sets, based on a comparison result of said second comparison unit, a parameter to set a degree of tone reduction of said tone reduction unit.

7. The apparatus according to claim 1, further comprising:
a first comparison unit which compares a data amount of the encoded data obtained by said additional information generator with a preset target code amount;
a second comparison unit which compares the number of third additional information generated by said additional information generator with a threshold decided by the total number of blocks included in the original image data if a comparison result of said first comparison unit indicates that the data amount of the encoded data exceeds the target code amount;
a resolution converter which converts the original image data into a resolution lower than the resolution of the original image data and outputs the data as encoded data if a comparison result of said second comparison unit indicates that the number of third additional information exceeds the threshold; and
a tone reduction unit which reduces the number of colors represented by each block of the original image data input by said input unit by adjusting values of pixels in each block and outputs the block which has undergone tone reduction to said encoder so as to execute re-encoding if the comparison result of said second comparison unit indicates that the number of third additional information is not more than the threshold.

8. A non-transitory computer-readable storage medium storing a computer program which causes a computer to function as an image encoding apparatus of claim 1 upon reading out and executing the computer program.

9. A method of controlling an image encoding apparatus for encoding image data, comprising the steps of:
inputting a block of 2×2 pixels from original image data of an encoding target;
generating and outputting reduced image data having a size smaller than the original image data by sampling one pixel data at a preset position in the input block; and
generating encoded data to restore three non-sampling target pixel data in each block so as to restore the original image data from the reduced image data generated in the step of generating and outputting the reduced image data,
wherein the step of generating the encoded data comprising the steps of:
letting X be a sampling target pixel in a block of interest, and Xa, Xb, and Xc be non-sampling target pixels in the block of interest, determining
condition (a): whether all the pixels Xa, Xb, and Xc are restorable from the pixel X in the block of interest, and
condition (b): whether all the pixels Xa, Xb, and Xc are restorable from sampling target pixels in three blocks adjacent to the block of interest; and
generating first additional information as encoded data of the block of interest when it is determined in the step of determining that the block of interest satisfies the condition (a),
generating second additional information different from the first additional information as the encoded data of the block of interest when it is determined in the step of determining that the block of interest satisfies not the condition (a) but the condition (b), and
generating third additional information different from the first additional information and the second additional information as the encoded data of the block of interest when it is determined in the step of determining that the block of interest satisfies neither the condition (a) nor the condition (b).

* * * * *